US011836073B2

(12) United States Patent
Liu et al.

(10) Patent No.: US 11,836,073 B2
(45) Date of Patent: Dec. 5, 2023

(54) STORAGE DEVICE OPERATING DATA COUNTER SYSTEM

(71) Applicant: Dell Products L.P., Round Rock, TX (US)

(72) Inventors: Alex Liu, Fremont, CA (US); Girish Desai, Fremont, CA (US); Leland W. Thompson, Tustin, CA (US)

(73) Assignee: Dell Products L.P., Round Rock, TX (US)

( * ) Notice: Subject to any disclaimer, the term of this patent is extended or adjusted under 35 U.S.C. 154(b) by 80 days.

(21) Appl. No.: 17/730,399

(22) Filed: Apr. 27, 2022

(65) Prior Publication Data

US 2023/0350796 A1 Nov. 2, 2023

(51) Int. Cl.
*G06F 12/02* (2006.01)
(52) U.S. Cl.
CPC .... *G06F 12/0238* (2013.01); *G06F 2212/202* (2013.01); *G06F 2212/254* (2013.01)
(58) Field of Classification Search
None
See application file for complete search history.

(56) References Cited

U.S. PATENT DOCUMENTS

| | | | | |
|---|---|---|---|---|
| 2011/0191528 | A1* | 8/2011 | Suzuki | G06F 12/02 711/E12.008 |
| 2011/0231594 | A1* | 9/2011 | Sugimoto | G06F 3/0688 711/E12.008 |
| 2014/0075095 | A1* | 3/2014 | Manohar | G06F 3/0608 711/E12.008 |
| 2016/0118126 | A1* | 4/2016 | Moon | G11C 16/12 711/103 |
| 2017/0329716 | A1* | 11/2017 | Huang | G06F 12/0246 |
| 2021/0349825 | A1* | 11/2021 | Kim | G06F 12/0891 |
| 2022/0058116 | A1* | 2/2022 | Kim | G06F 12/0873 |

* cited by examiner

*Primary Examiner* — Charles Rones
*Assistant Examiner* — Ryan Dare
(74) *Attorney, Agent, or Firm* — Joseph Mencher

(57) ABSTRACT

A counter system includes a counter management subsystem, a storage subsystem having storage elements, and a non-volatile memory system storing a first counter including a first value field/first bitmap field combination for each storage element, and a second counter including a second value field/second bitmap field combination for each storage element. The counter management subsystem resets the first counter and, following each storage operation on a storage element, updates a bit in the first bitmap field for that storage element. When one of the first bitmap fields is filled, the counter management subsystem converts each first value field/first bitmap field combination to a respective first value, resets the second counter, updates the second value field for each storage element with the respective first value for each storage element and, following each storage operation on a storage element, updates a bit in the second bitmap field for that storage element.

20 Claims, 28 Drawing Sheets

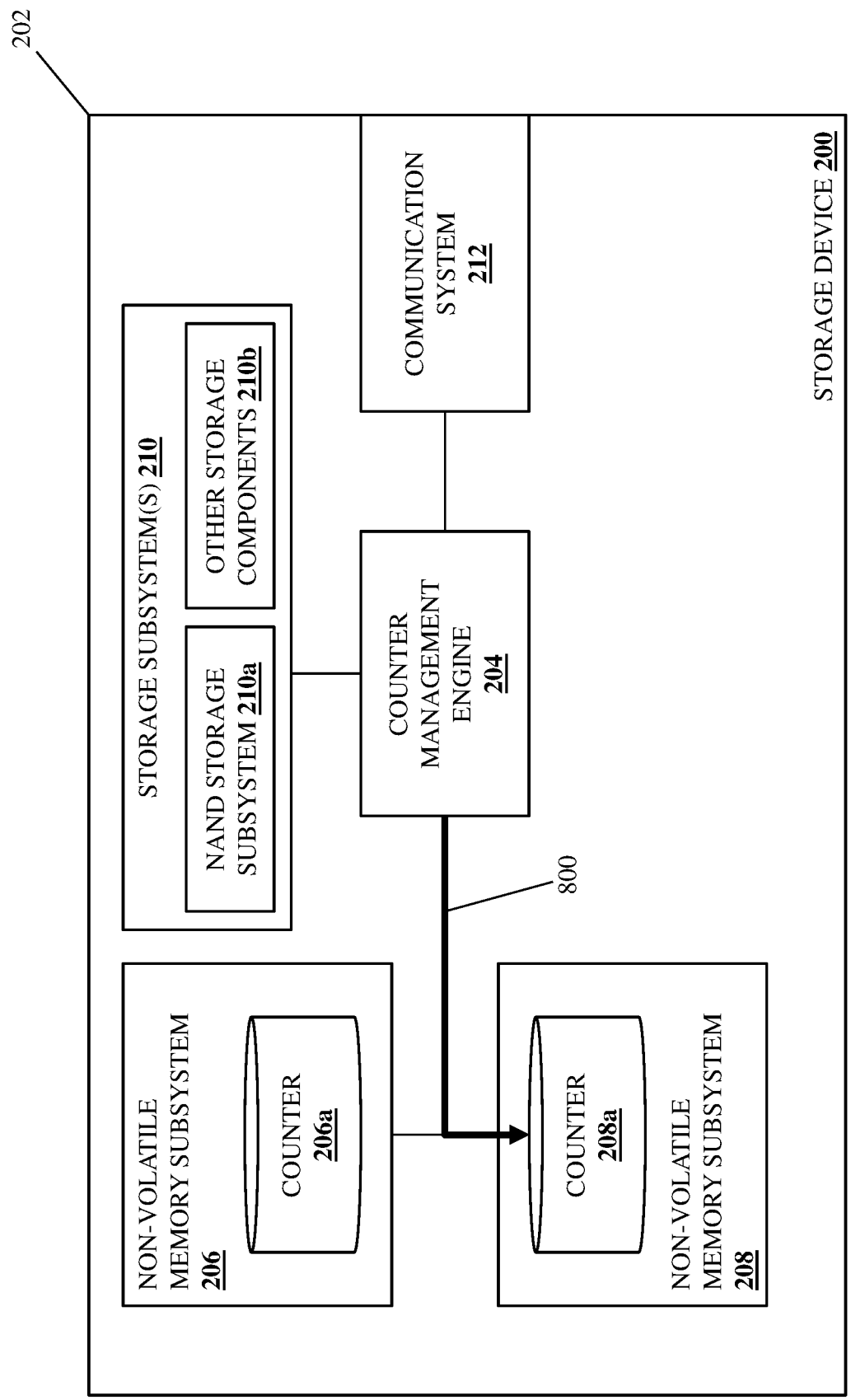

STORAGE DEVICE OPERATING DATA COUNTER SYSTEM

BACKGROUND

The present disclosure relates generally to information handling systems, and more particularly to tracking storage device operating data via counters in storage devices utilized in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, storage systems, desktop computing devices, laptop/notebook computing devices, tablet computing devices, mobile phones, and/or other computing devices known in the art, utilize storage devices for the storage of data. For example, Solid-State Drive (SSD) storage devices are often included in computing devices, and may utilize a NAND flash storage subsystem that includes a plurality of NAND flash die each having NAND flash blocks made up of non-volatile cells that provide for the storage of the data discussed above. Furthermore, the use of NAND flash storage subsystems in the SSD storage device generates a variety of operating data during its operation and lifetime that is often tracked via counters and used to identify storage device states, determine policies for storage device warranties, and/or utilized in other manners that would be apparent to one of skill in the art in possession of the present disclosure. For example, the performance of Program/Erase (P/E) cycles (e.g., the programming and erasing of NAND flash blocks in a NAND flash storage subsystem included in an SSD storage device) generates operating data for SSD storage devices that may be tracked via counters to allow for a determination of a usage level of the SSD storage device, aggregated across a plurality of storage devices of the same type in order to implement a warranty policy (e.g., by determining how many P/E cycles that type of storage device typically experiences before the end of its lifetime and using that number of P/E cycles to determine warranty details for that type of storage device), and/or utilized in other manners known in the art. The conventional tracking of such operating data via counters raises a number of issues.

For example, the inventors of the present disclosure have discovered that conventional storage device counter systems are inefficient in the amount of space they utilize to track operating data, unnecessarily complex, and/or do not adequately protect the operating data being tracked. To provide a specific example directed to the tracking of operating data generated via the performance of P/E cycles in superblocks that are made up of a plurality of the NAND blocks discussed above, some conventional storage device counter systems utilize a "down counter" technique in which each erase operation performed on a superblock is tracked via a bit (e.g., a "1") in the counter, which consumes a relatively large amount of storage space. For example, for superblocks made up of NAND blocks with expected P/E cycle lifetimes of 8000 P/E cycles, each superblock requires [8000 P/E cycles*1/(8 bits/byte)=] 1000 bytes of counter storage space per superblock. Thus, for a 4 TB capacity SSD storage device with 2048 superblocks, a single copy of the counter will require [1000*2048=]~2 MB of storage space.

To provide another specific example, other conventional storage device counter systems utilize a "digital counter" technique that saves counter values in a storage system each time there is a change (e.g., after any P/E cycle (e.g., at 2000 P/E cycles) the conventional storage device counter system may save that P/E cycle value (e.g., "2000" P/E cycles) to the storage system, then following the next P/E cycle the conventional storage device counter system may identify the current P/E cycle count (e.g., "2000" P/E cycles) in the storage system, increment it by 1 P/E cycle (e.g., to 2001 P/E cycles), and the save the updated P/E cycle value (e.g., "2001 P/E cycles") to the storage system, and so on). As will be appreciated by one of skill in the art in possession of the present disclosure, such conventional storage device counter systems are relatively complex, as they require a search for the current P/E cycle value whenever a P/E cycle occurs and the P/C cycle count must be updated, and may require additional algorithms to determine which P/E cycle values may be erased from the storage system (e.g., during garbage collection operations), while the saving of multiple P/E cycle values to the storage system requires data structures to track their associated superblocks as well as the location of the current P/E cycle value.

Some conventional storage device counter systems attempt to remedy some of the issues discussed above by storing the P/E cycle value in the Random Access Memory (RAM) and only updating it at particular time increments or P/E cycle increments, but those solutions require indexing of the modified counters, as well as a mechanism to save the P/E cycle value upon power failure. Furthermore, other "digital counter" techniques for conventional storage device counter systems include storing the P/E cycle value in the RAM and then backing up that P/E cycle value to a non-volatile memory system periodically, with the P/E cycle value saved to the NAND flash storage subsystem upon power failure. However, given the storage requirements for P/E cycle values (e.g., 2048 P/E cycle values for 2048 superblocks in a 4 TB SSD storage device in the example above), there may not be enough time to backup that P/E cycle operating data in the event of a power failure.

Accordingly, it would be desirable to provide storage device counter system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a counter management engine that is configured to: reset, in a first counter stored in a non-volatile memory system, a respective first value field and a respective first bitmap field for each of a plurality of storage elements in at least one storage subsystem; update, in response to a storage operation being performed on any of the plurality of storage elements, a bit in the respective first bitmap field for that storage element; determine that one of the respective first bitmap fields for one of the plurality of storage elements has had all of its bits updated and, in response, convert the respective first value field and the respective first bitmap field for each of the plurality of storage elements to a respective first value for each of the plurality of storage elements; reset, in a second counter stored in the non-volatile memory system, a respective second value field and a respective second bitmap field for each of the plurality of storage elements in the at least one storage subsystem; update the respective second value field for each of the plurality of storage elements with the respective first value for each of the plurality of storage elements; and update, in response to the storage operation being performed on any of the plurality of storage elements, a bit in the respective second bitmap field for that storage element.

BRIEF DESCRIPTION OF THE DRAWINGS

FIG. 8A is a schematic view illustrating an embodiment of the storage device of FIG. 2 operating during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
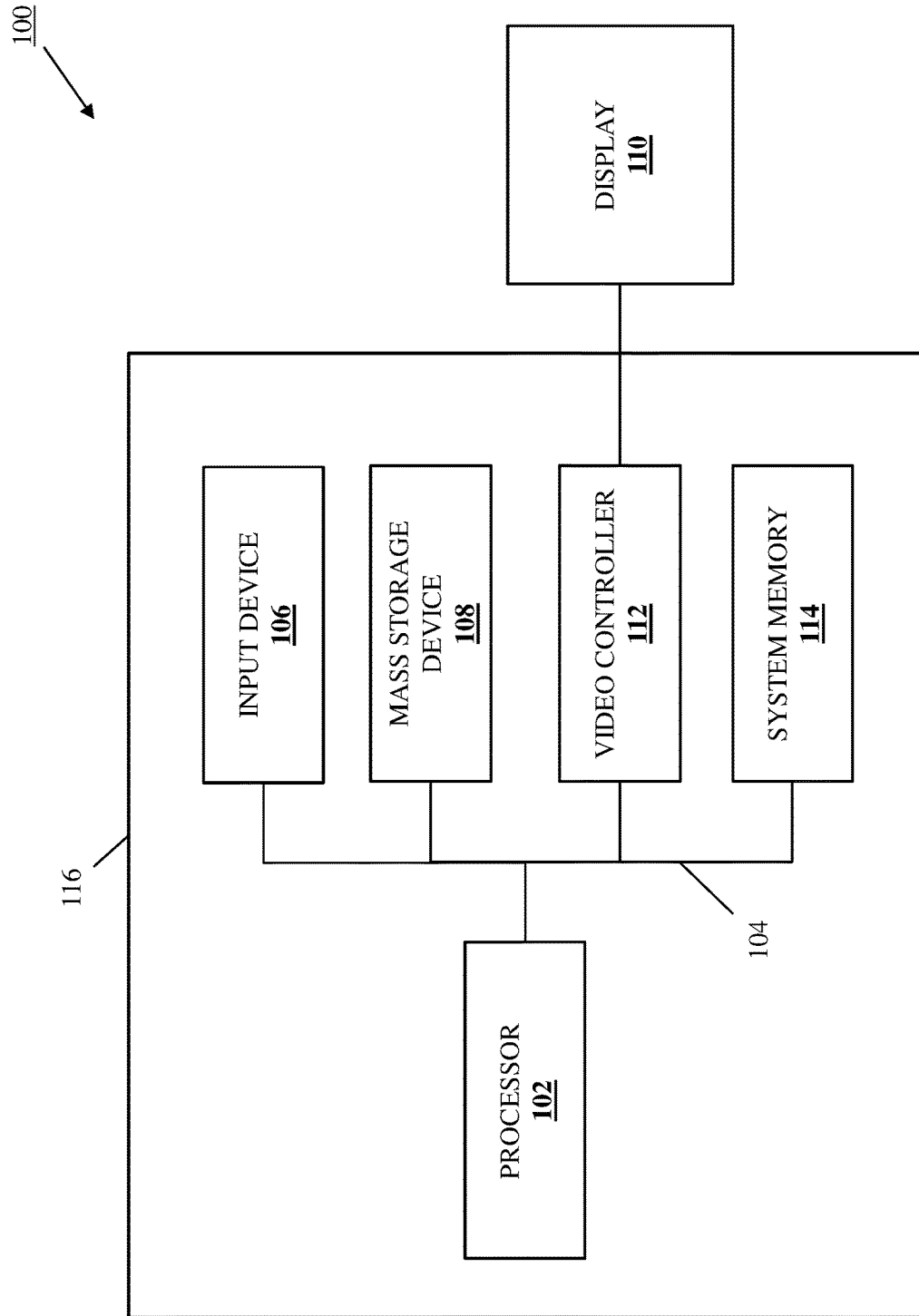
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
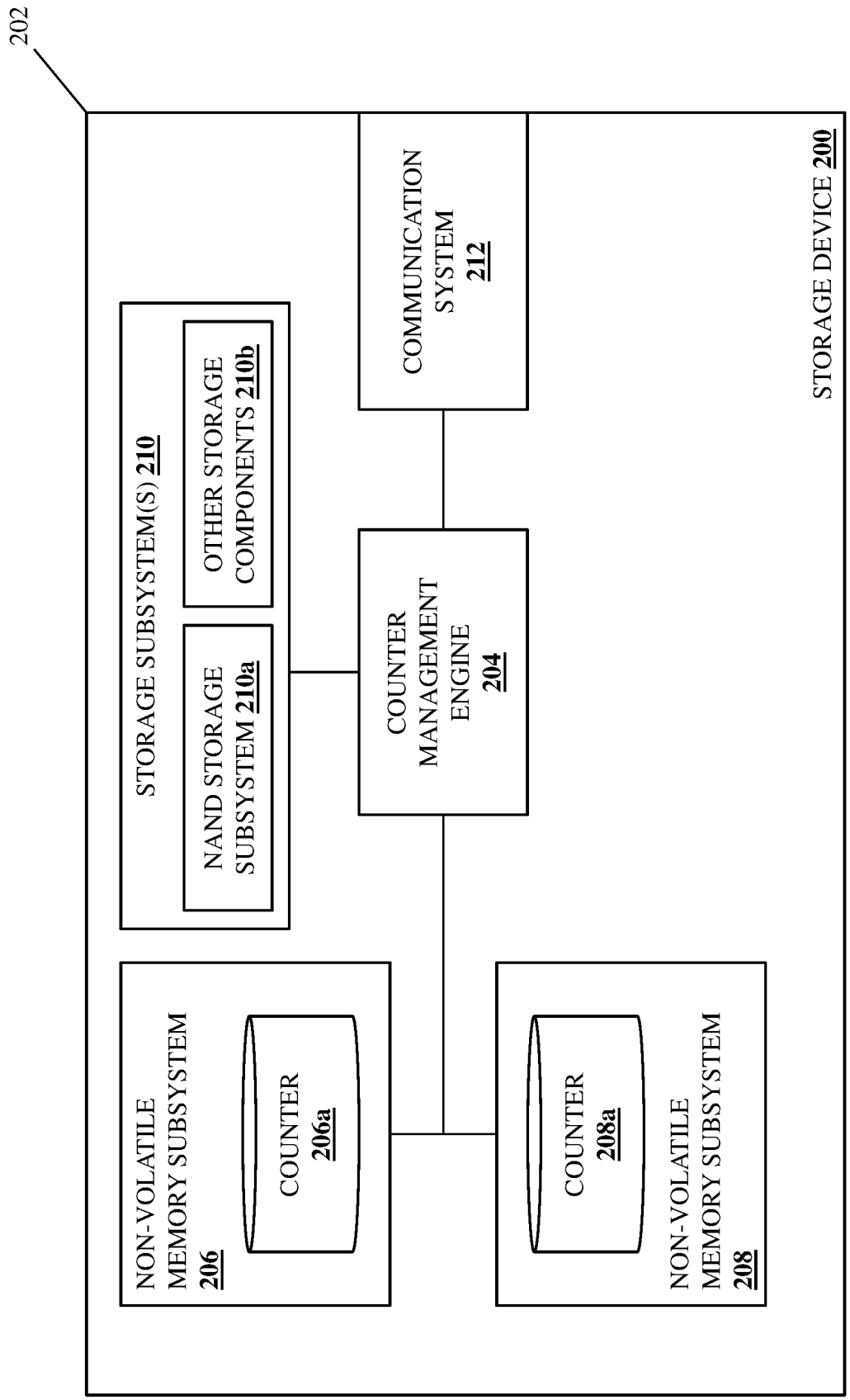
FIG. 2 is a schematic view illustrating an embodiment of a storage device that may utilize the storage device operating data counter system of the present disclosure.

Referring now to FIG. 2, an embodiment of a storage device 200 is illustrated that may utilize the storage device operating data counter system of the present disclosure. In an embodiment, the storage device 200 may be provided by the IHS 100 discussed above with reference to FIG. 1, and/or may provide a component (e.g., the storage device 108 discussed above with reference to FIG. 1) of the IHS 100, and in the specific examples described below is provided by a Solid-State Drive (SSD) storage device. However, while illustrated and discussed as being provided by an SSD storage device, one of skill in the art in possession of the present disclosure will recognize that the functionality of the storage device 200 discussed below may be provided by other devices that are configured to operate similarly as the storage device 200 discussed below.

In the illustrated embodiment, the storage device 200 includes a chassis 202 that houses the components of the storage device 200, only some of which are illustrated and described below. For example, the chassis 202 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide storage firmware that includes a counter management engine 204 that is configured to perform the functionality of the counter management engines, counter management subsystems, storage firmware, and/or storage devices discussed below. However, while the counter management functionality is described below as being performed by firmware, one of skill in the art in possession of the present disclosure will appreciate how that functionality may be enabled using a variety of other processing techniques that will fall within the scope of the present disclosure as well.

The chassis 202 may also house a non-volatile memory system that is coupled to the counter management engine 204 (e.g., via a coupling between the non-volatile memory system and the processing system) and that, in the embodiments described below, is provided by a non-volatile memory subsystem 206 and a non-volatile memory subsystem 208. In a specific example, the non-volatile memory subsystems 206 and 208 may each be provided by respective NOR memory devices (e.g., NOR flash memory devices/chips), respective persistent memory (PMEM) subsystems in the storage device 200, and/or other non-volatile memory subsystems that would be apparent to one of skill in the art in possession of the present disclosure. However, while the non-volatile memory subsystems 206 and 208 are illustrated and described as being provided by separate non-volatile memory devices/chips, one of skill in the art in possession of the present disclosure will appreciate how the non-volatile memory subsystems 206 and 208 may be provided in the same non-volatile memory device or chip while remaining within the scope of the present disclosure as well. As illustrated, the non-volatile memory subsystem 206 stores a counter 206a, and the non-volatile memory subsystem 208 stores a counter 208a, each of which is discussed in further detail below.

The chassis 202 also includes one or more storage subsystem(s) 210 that are coupled to the counter management engine 204 (e.g., via a coupling between the storage subsystem(s) 210 and the processing system) and that, in the embodiments described below, include a NAND flash storage subsystem 210a (also referred to as a "NAND storage subsystem") that may be provided by NAND flash packages (also referred to as "NAND flash packages") including NAND flash dies (also referred to as "NAND flash dies") having NAND flash blocks (also referred to as "NAND blocks") made up of non-volatile cells that store data. As will be appreciated by one of skill in the art in possession of the present disclosure, NAND storage can be provided in a variety of manners (e.g., a NAND digital gate), but there is no "NAND" gate in NAND memory, and rather it is so named because configuration of the non-volatile cells in the memory resemble a NAND logic gate. As such, one of skill in the art in possession of the present disclosure will appreciate how the term "NAND" used herein provides a representative name rather than a functional name.

However, while a specific NAND storage subsystem 210a is described below, one of skill in the art in possession of the present disclosure will appreciate how the storage device 200 may utilize other types of storage subsystems that will benefit from the teachings of the present disclosure and thus will fall within its scope as well. Furthermore, the storage subsystem(s) 210 are illustrated as including other storage components 210b that one of skill in the art in possession of the present disclosure would recognize as benefitting from the teachings of the present disclosure, and thus while the examples below describe the tracking of storage device operating data related to the operation of the NAND storage subsystem 210a, the tracking of other storage device operating data generated during the operation of the other storage components (or other operating data generated during the operation of other types of devices/components) will fall within the scope of the present disclosure as well.

The chassis 202 may also house a communication system 212 that is coupled to the counter management engine 204 (e.g., via a coupling between the communication system 208 and the processing system) and that may be provided by any of a variety of storage device communication components that would be apparent to one of skill in the art in possession of the present disclosure. However, while a specific storage device 200 is illustrated and described below, one of skill in the art in possession of the present disclosure will recognize that storage devices (or other devices operating according to the teachings of the present disclosure in a manner similar to that described below for the storage device 200) may include a variety of components and/or component configurations for providing conventional storage device functionality, as well as the functionality discussed below, while remaining within the scope of the present disclosure as well. Furthermore, while a storage device is illustrated and described below as utilizing the operating data counter system of the present disclosure, one of skill in the art in possession of the present disclosure will appreciate how the operating data counter system of the present disclosure may be utilized to track operating data produced by other types of devices while remaining within the scope of the present disclosure as well.

Figure 3:
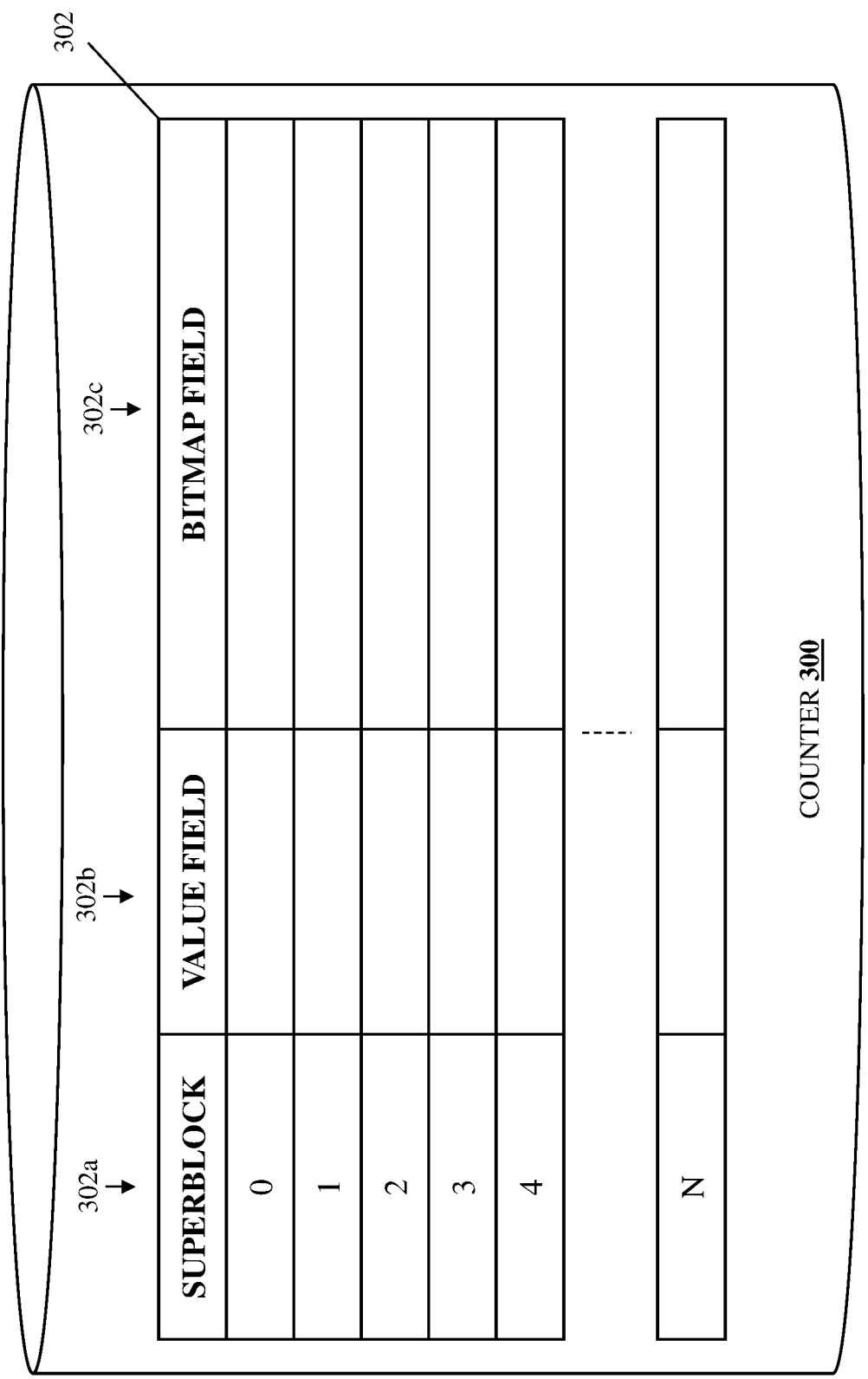
FIG. 3 is a schematic view illustrating an embodiment of a counter that may be included in the storage device of FIG. 2.

Referring now to FIG. 3, an embodiment of a counter 300 is illustrated that may provide the counters 206*a* and/or 208*a* discussed above with reference to FIG. 2. In the illustrated embodiment, the counter 300 includes a counter table 302 having a storage element column 302*a* that, in the illustrated embodiment, identifies superblocks that may be provided by NAND blocks in the NAND storage subsystem 210*a* discussed above with reference to FIG. 3. However, while specific "superblock" storage elements are illustrated and discussed in the examples below, one of skill in the art in possession of the present disclosure will recognize how the counter 300 may provide for the tracking of operating data of other storage elements, storage components, and/or storage subsystems while remaining within the scope of the present disclosure as well.

The counter table 302 also include a value field column 302*b* that, in the examples provided below, includes value fields that are each configured to store a 2 byte value, but that one of skill in the art in possession of the present disclosure will appreciate may be configured to store different size values (e.g., larger values or smaller values than those utilized in the examples provided herein) while remaining within the scope of the present disclosure as well. The counter table 302 also include a bitmap field column 302*c* that, in the examples provided below, includes bitmap fields that are each configured to store a 2 byte/16 bit bitmap, but that one of skill in the art in possession of the present disclosure will appreciate may be able to store different size bitmaps (e.g., larger bitmaps or smaller bitmaps than those utilized in the examples provided herein) while remaining within the scope of the present disclosure as well. As will be appreciated by one of skill in the art in possession of the present disclosure, the storage element column 302*a*, value field column 302*b*, and bitmap field column 302*c* in the counter table 302 provide a plurality of storage element counter rows that each include a respective value field and a respective bitmap field (a "value field/bitmap field combination") for a respective storage element. Using the superblock counter rows in the specific examples provided herein, each superblock counter row in the counter table 302 includes a respective value field/bitmap field combination for a respective superblock (e.g., superblock 0 has a respective value field and a respective bitmap field, superblock 1 has a respective value field and a respective bitmap field, and so on). However, while a specific counter 300 has been illustrated and described, one of skill in the art in possession of the present disclosure will appreciate how the counters utilized as described herein may be modified for other implementations while remaining within the scope of the present disclosure as well.

Figure 4A:
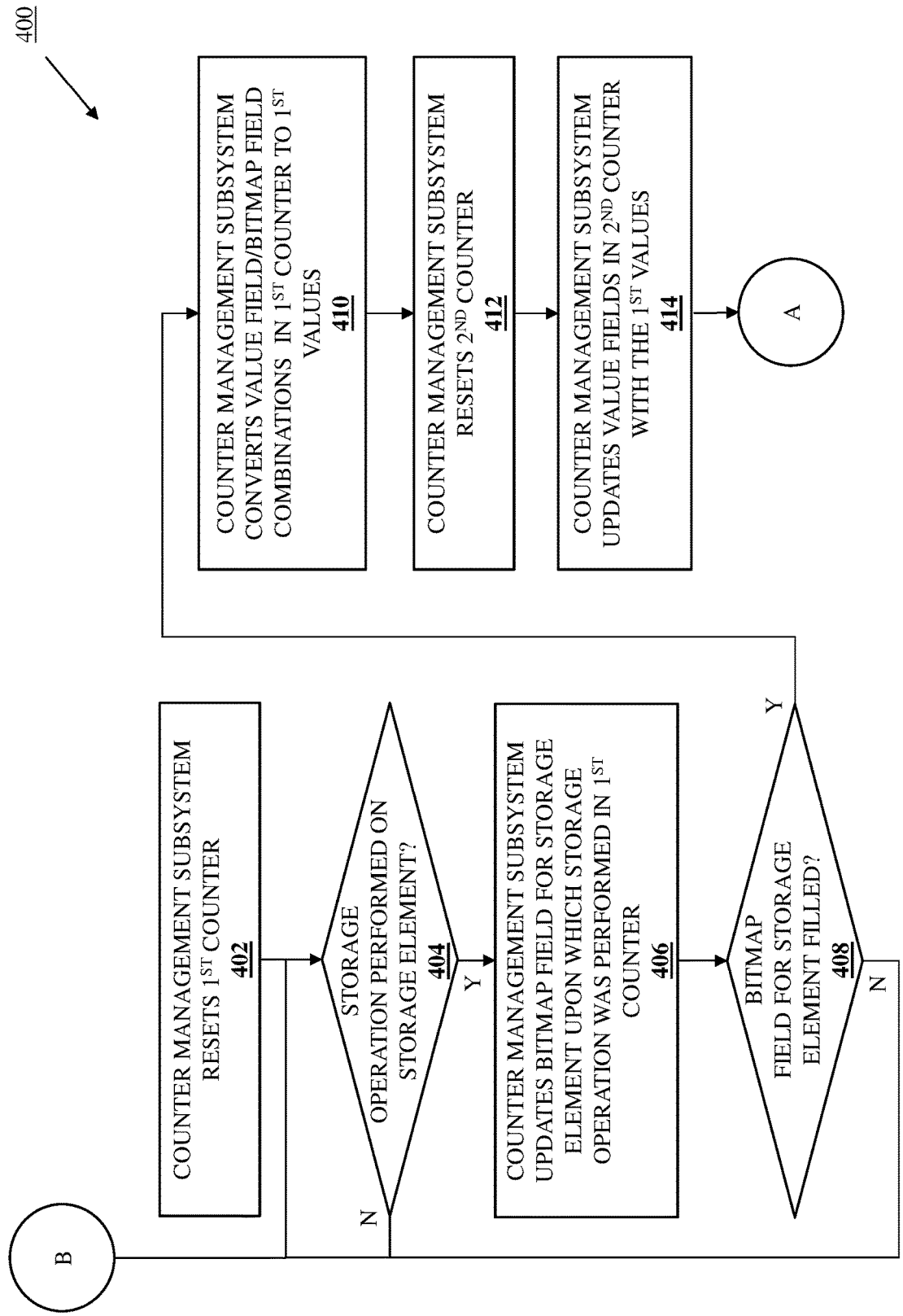
FIG. 4A is a flow chart illustrating an embodiment of a portion of a method for tracking storage device operating data via counters.
Figure 4B:
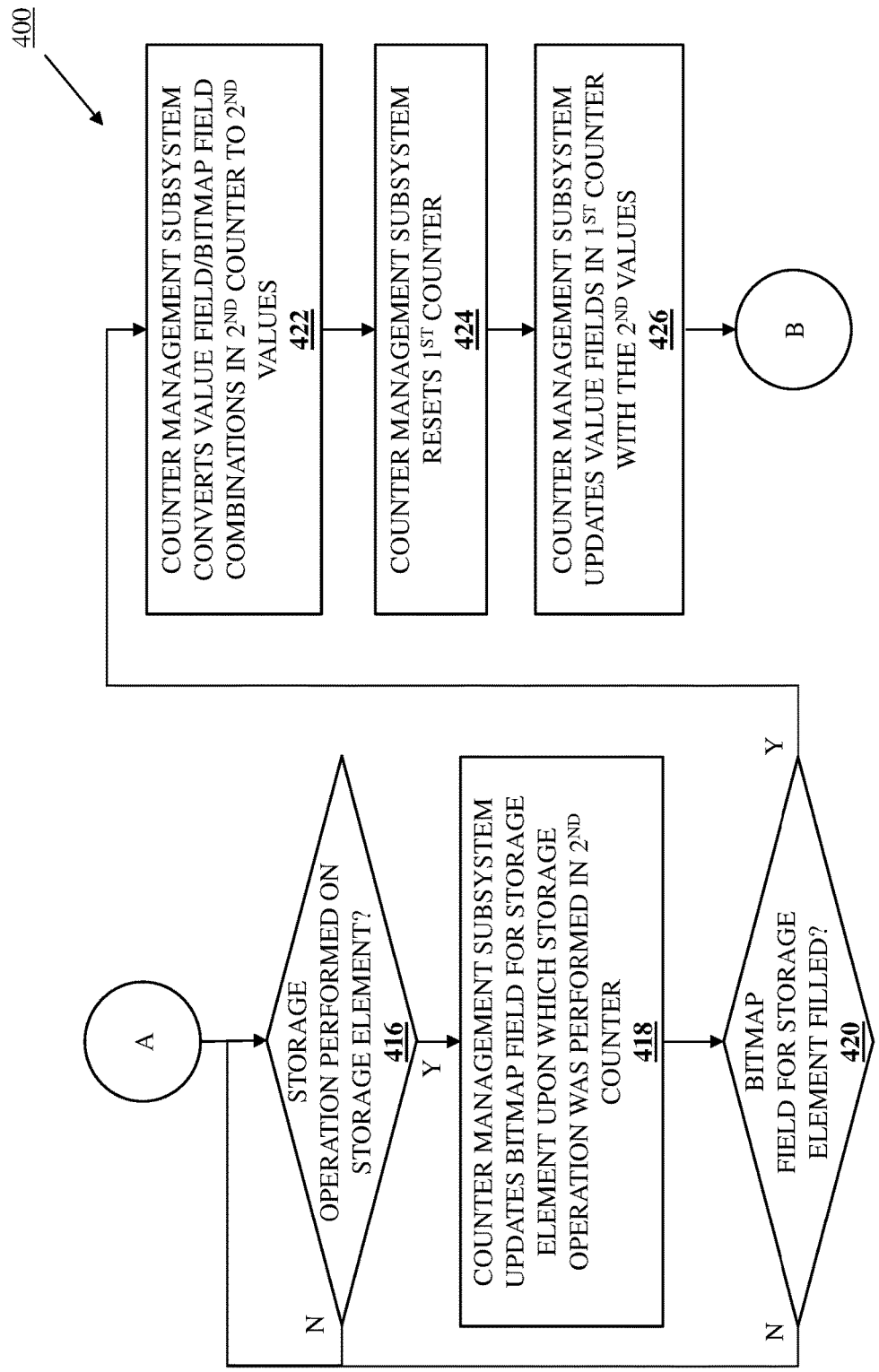
FIG. 4B is a flow chart illustrating an embodiment of a portion of the method of FIG. 4A for tracking storage device operating data via counters.

Referring now to FIGS. 4A and 4B, an embodiment of a method 400 for tracking operating data via counters is illustrated. As discussed below, the systems and methods of the present disclosure utilize a hybrid value field/bitmap field counting technique for tracking operating data generated in response to operations performed on elements in a device in order to reduce the amount of space needed to track such operating data, while also ensuring operating data redundancy. For example, the counter system of the present disclosure may include a counter management subsystem, a storage subsystem having storage elements, and a non-volatile memory system storing a first counter including a first value field/first bitmap field combination for each storage element, and a second counter including a second value field/second bitmap field combination for each storage element. The counter management subsystem resets the first counter and, following each storage operation on a storage element, updates a bit in the first bitmap field for that storage element. When one of the first bitmap fields is filled, the counter management subsystem converts each first value field/first bitmap field combination to a respective first value for each storage element, resets the second counter, stores the respective first value for each storage element in the second value field for each storage element and, following each storage operation on a storage element, updates a bit in the second bitmap field for that storage element. As such, the space needed to track operating data generated by storage devices is greatly reduced while also being protected in the event of memory corruption or power loss.

The method 400 begins at block 402 where a counter management subsystem resets a first counter. As will be appreciated by one of skill in the art in possession of the present disclosure, the storage device 200 discussed below may be provided in a computing device (e.g., as the storage device 108 in the IHS 100 discussed above with reference to FIG. 1) and utilized to store data using the storage subsystem(s) 210 (e.g., by writing, reading, and erasing data in the NAND storage subsystem 210*a*), as well as perform other storage operations, that generate storage device operating data. However, as discussed above, while the operating data counter system of the present disclosure is described in the examples herein as being utilized with a storage device, the use of the operating data counter system of the present disclosure with other devices and/or to track other data is envisioned as falling within the scope of the present disclosures as well.

Figure 5A:
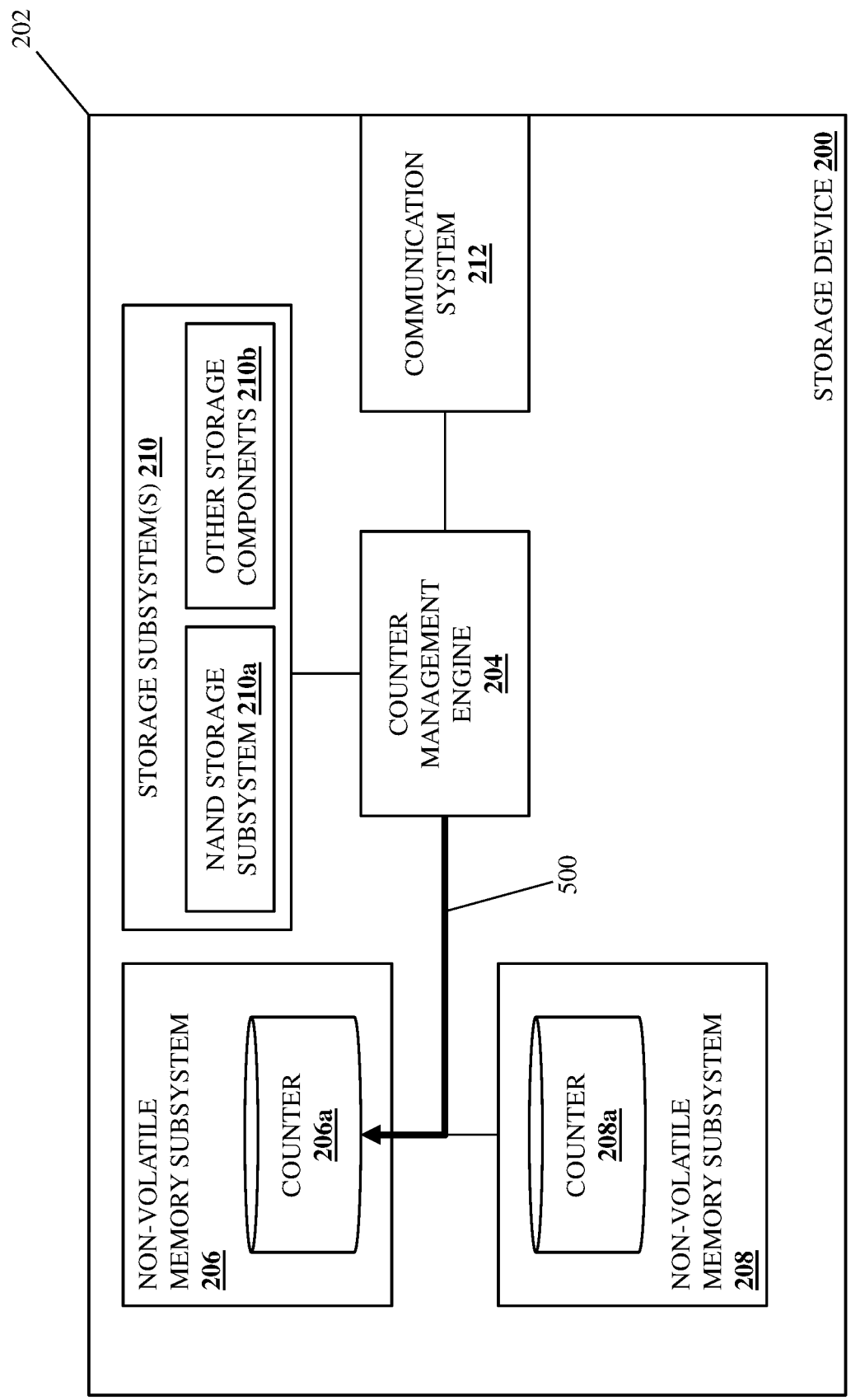
FIG. 5A is a schematic view illustrating an embodiment of the storage device of FIG. 2 operating during the method of FIG. 4.

With reference to FIG. 5A, in an embodiment of block 402, the counter management engine 204 in the storage device 200 may perform counter reset operations 500 that include resetting the counter 206*a* stored in the non-volatile memory subsystem 206. In examples in which the storage device 200 is "new" (e.g., immediately subsequent to its manufacture, prior to being provided in a computing device, subsequent to being provided to a computing device but prior to any use of the storage device 200, etc.), both the counter 206*a* stored in the non-volatile memory subsystem 206 and the counter 208*a* stored in the non-volatile memory subsystem 208 may be "zeroed-out" or otherwise not in need of a reset (e.g., those counters 206*a* and 208*a* may be in the same state as they would be if they were reset), and thus block 402 may be skipped. However, in any situation in which the counter 206*a* stored in the non-volatile memory subsystem 206 is not "zeroed-out", the counter reset operations 500 may be performed to reset the counter 206*a* stored in the non-volatile memory subsystem 206. As such, while an initial iteration of block 402 method 400 may not require any reset of the counter 206a stored in the non-volatile memory subsystem 206 (e.g., when the storage device 200 is new), as discussed below subsequent iterations of the method 400 will typically require reset of the counter 206a stored in the non-volatile memory subsystem 206.

Figure 5B:
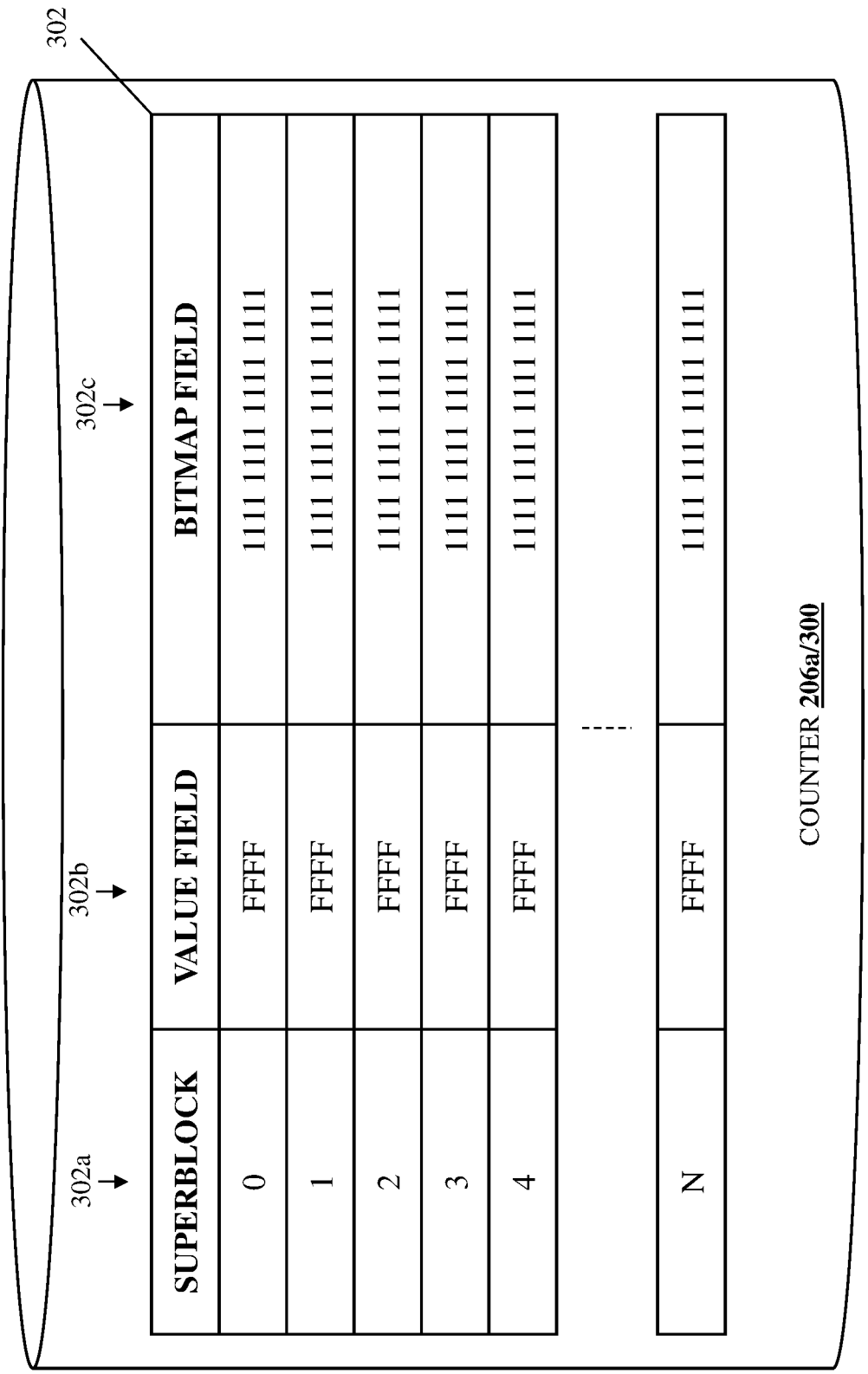
FIG. 5B is a schematic view illustrating the operation of the counter of FIG. 3 operating during the method of FIG. 5.

With reference to FIG. 5B, an embodiment of the counter 206a/300 following the counter reset operations 500 is illustrated. As can be seen, following the counter reset operations 500, the respective value field for each of the superblocks 0-N identified by the counter 206a/300 includes a "FFFF" (or "65535") value, while the respective bitmap field for each of the superblocks 0-N identified by the counter 206a/300 includes a "1111 1111 1111 1111" bitmap. To provide a specific example, the non-volatile memory subsystems 206 and 208 (e.g., NOR chips, PMEM subsystems, etc.) that store the counters 206a/300 and 208a/300 may require erasing before they can be written, with the minimum erase unit being a sector (e.g., a 4 KB sector), and the erasing causing all bits in the bitmap fields to become a "1". As such, the counter reset operations 500 may include erase operations (e.g., erasing a sector of the non-volatile memory subsystem 206 that stores the counter 206a) that result in the respective bitmap field for each of the superblocks 0-N in the counter 206a including the "1111 1111 1111 1111" bitmap illustrated in FIG. 6A. Furthermore, the non-volatile memory subsystems 206 and 208 may only support "1" to "0" bit transitions, while supporting random byte read/write operations.

As such, counter reset operations utilized herein may set all the bits in the bitmap fields to "1's" (with those bits then only programmable from that "1" state to a "0" state), while setting the values in the value fields to "FFFF" (or "65535"). However, while specific non-volatile memory subsystems/counter properties and particular counter reset operations are illustrated and described herein, one of skill in the art in possession of the present disclosure will appreciate how other non-volatile memory subsystems, counters, and/or counter reset operations may be provided while still enabling the functionality described below, and thus are envisioned as falling within the scope of the present disclosure as well.

Figure 6:
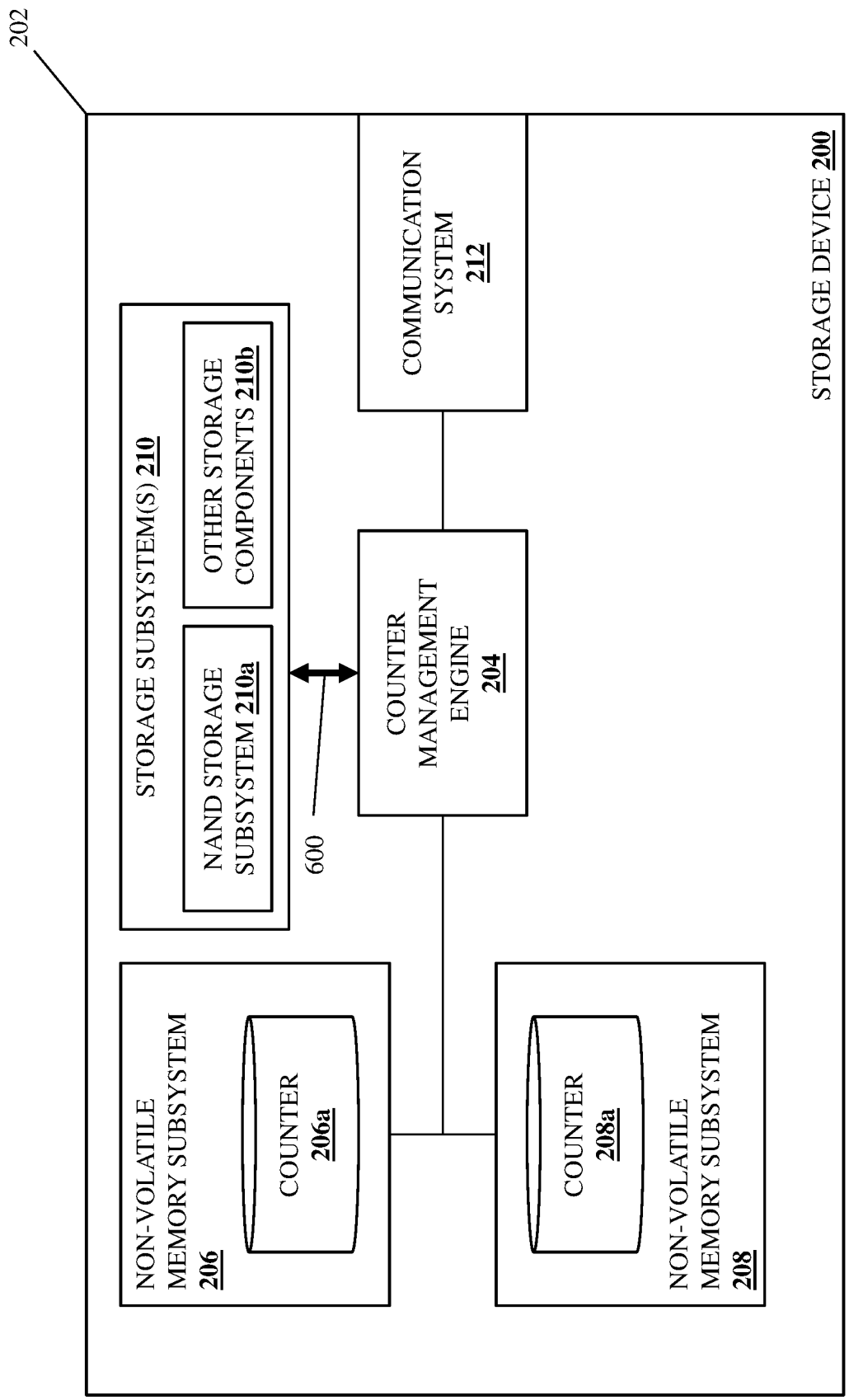
FIG. 6 is a schematic view illustrating an embodiment of the storage device of FIG. 2 operating during the method of FIG. 4.

The method 400 then proceeds to decision block 404 where it is determined whether a storage operation was performed on a storage element. With reference to FIG. 6, in an embodiment of decision block 404, the counter management engine 204 in the storage device 200 may perform storage subsystem monitoring operations 600 that may include monitoring the storage subsystem(s) 210 in order to determine whether a storage operation was performed on a storage element. In some examples, the counter management engine 204 may be separate from a storage engine in the storage device 200 that performs NAND storage subsystem data storage operations (e.g., operations that provide for the storage of data in non-volatile cells of NAND blocks in the NAND storage subsystem 210a), and thus the counter management engine 204 may monitor the storage subsystem(s) 210 and/or that storage engine for the storage operation at decision block 404. However, in other examples, the counter management engine 204 may be integrated with a storage engine in the storage device 200 that performs NAND storage subsystem data storage operations, and thus the counter management engine 204 may identify storage operations it performs at decision block 404 without the need to actually access the storage subsystem(s) 210 as illustrated in FIG. 6. In the specific examples below, the storage elements are provided by superblocks, and the storage subsystem monitoring operations 600 are described as monitoring the NAND storage subsystem 210a to determine whether a storage operation is performed that identifies a P/E cycle in a superblock.

For example, as discussed above, the NAND storage subsystem 210a may include a plurality of NAND die that each include a plurality of NAND blocks, and superblocks may be defined for the NAND storage subsystem 210a that each include a respective NAND block from each NAND die (e.g., superblock 0 may include the respective NAND block 0 from each of the NAND dies in the NAND storage subsystem 210a, superblock 1 may include the respective NAND block 1 from each of the NAND dies in the NAND storage subsystem 210a, and up to superblock N may include the respective NAND block N from each of the NAND dies in the NAND storage subsystem 210a). Furthermore, one of skill in the art in possession of the present disclosure will appreciate how any particular superblock may have all of its NAND blocks erased at once, and thus erase operations may be performed on any superblock to erase each NAND block that provides that superblock. However, while erase operations that identify P/E cycles in superblocks (and thus identify P/E cycles in the NAND blocks that define those superblocks) are described herein as being monitored at decision block 404, one of skill in the art in possession of the present disclosure will appreciate how other storage operations/storage elements (e.g., block update times, block erase times, etc.) may be monitored at decision block 404 of the method 400 while remaining within the scope of the present disclosure as well.

If, at decision block 404, it is determined that the storage operation was not performed on a storage element, the method 400 returns to decision block 404. As such, the method 400 may loop such that the counter management engine 204 continues to monitor for a storage operation on storage elements in the storage subsystem(s) 210 in the storage device until that storage operation is detected. Continuing with the specific example provided above, the counter management engine 204 may continue to monitor for an erase operation on superblocks in the NAND storage subsystem 210a in the storage device until that erase operation, which identifies a P/E cycle for NAND blocks that define those superblocks, is detected.

Figure 7A:
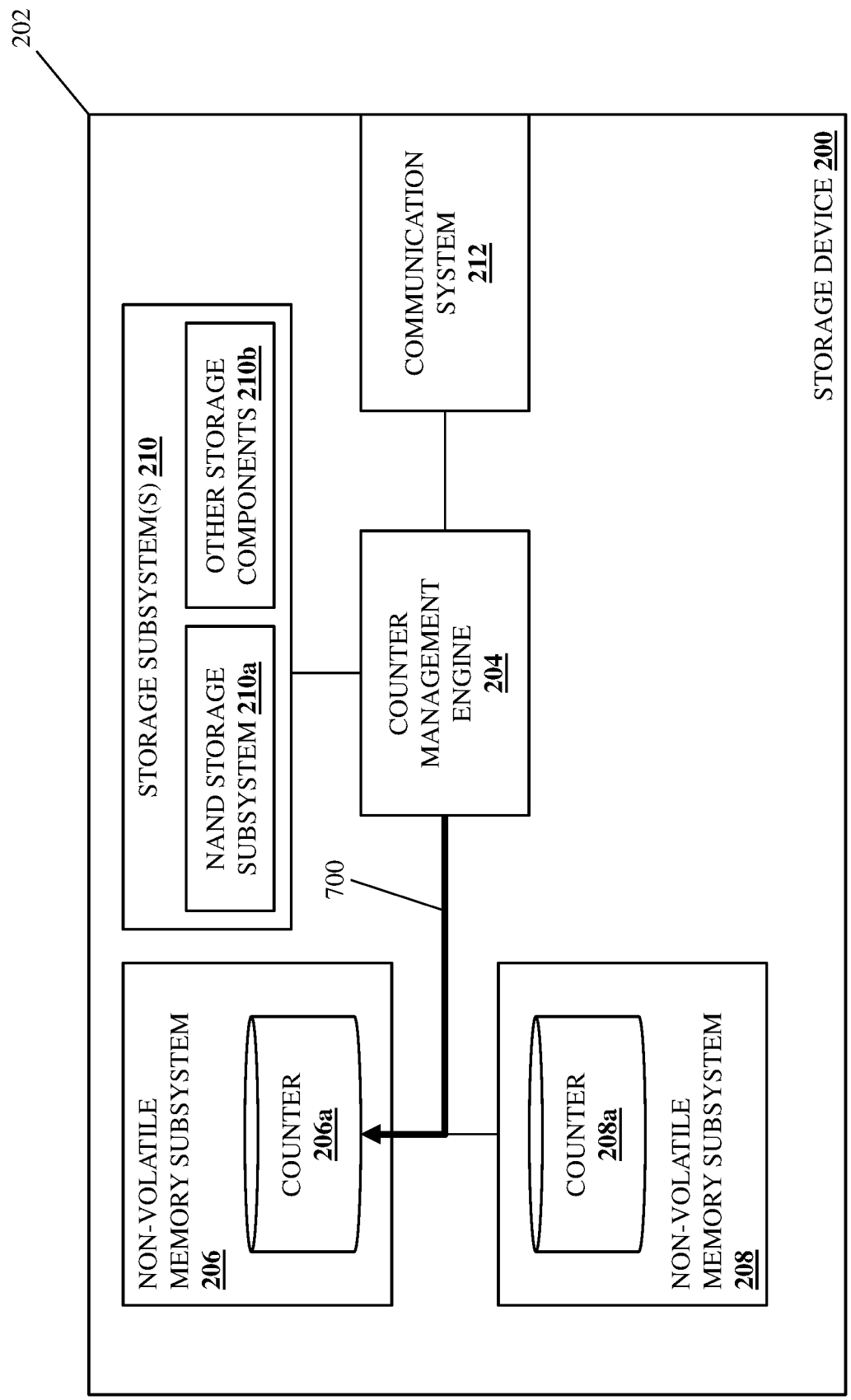
FIG. 7A is a schematic view illustrating an embodiment of the storage device of FIG. 2 operating during the method of FIG. 4.

If at decision block 404, it is determined that the storage operation was performed on a storage element, the method 400 proceeds to block 406 where the counter management subsystem updates a bitmap field for the storage element upon which the storage operation was performed in the first counter. With reference to FIG. 7A, in an embodiment of block 406, the counter management engine 204 in the storage device 200 may perform counter update operations 700 that include updating the counter 206a by updating the respective bitmap field for the superblock upon which the erase operation identifying a P/E cycle was detected at decision block 404. To provide a specific example, consider superblock 0 identified in the counter 206a/300 with the bitmap field having the "1111 1111 1111 1111" bitmap illustrated in FIG. 5B, which as discussed above is the state of that bitmap field following reset and prior to any P/E cycles of superblock 0 subsequent to that reset. In the event an erase operation that identifies a P/E cycle is performed on the superblock 0 and detected at decision block 404, the counter update operations 700 performed by the counter management engine 204 will include updating the bitmap field for the superblock 0 to a bitmap "1111 1111 1111 1110", i.e., changing the "last" bit in that bitmap field from a "1" to a "0". As will be appreciated by one of skill in the art in possession of the present disclosure, the updating of a bit in a bitmap field in the counter table will be associated with a relatively very low "update overhead", and thus may be performed relatively quickly with little required processing power.

The method 400 then proceeds to decision block 408 where it is determined whether the bitmap field for the storage element was filled. In an embodiment, at decision block 408 and following the updating of a bitmap field for the storage element upon which a storage operation was performed, the counter management engine 204 in the storage device 200 may perform bitmap field capacity determination operations that include determining whether the updating of that bitmap field has filled that bitmap field (i.e., has updated that bitmap field to capacity such that it cannot store any further storage operation update data without being erased). Continuing the specific examples discussed above in which each bitmap field in the counter table 302 of the counter 206a/300 is a 2 byte/16 bit field, the bitmap field capacity determination operations performed by the counter management engine 204 may include determining whether the bitmap field includes a "0000 0000 0000 0000" bitmap, which as described herein will occur when erase operations that identify P/E cycles for the corresponding superblock have been performed 16 times subsequent to the resetting of that bitmap field (i.e., the bitmap field provided for any superblock will be filled after 16 P/E cycles of that superblock). However, while a specific example of bitmap fields with capacity to identify 16 storage operations are described, one of skill in the art in possession of the present disclosure will appreciate that bitmap fields may be provided that have capacity to identify more storage operations (32 storage operations, 64 storage operations, etc.) while remaining within the scope of the present disclosure as well.

Figure 7B:
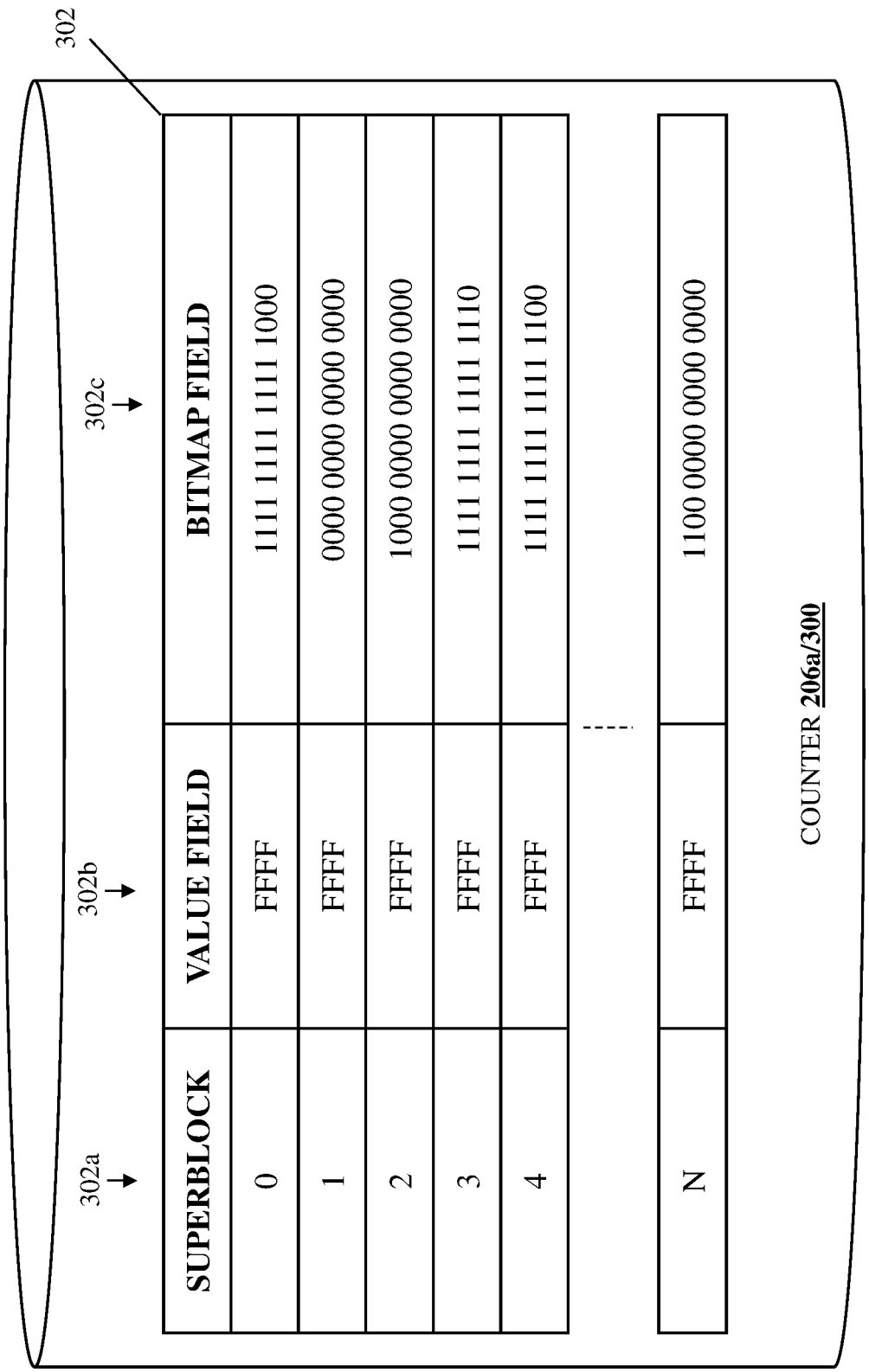
FIG. 7B is a schematic view illustrating the operation of the counter of FIG. 3 operating during the method of FIG. 5.

If, at decision block 408, it is determined that the bitmap field for the storage element was not filled, the method 400 returns to decision block 404. As such, the method 400 may loop such that the counter management engine 204 in the storage device 200 monitors for the storage operation on superblocks at decision block 404 and updates the bitmap field for any superblock upon which a storage operation is performed at block 406 as long as no bitmap fields in the counter table 302 in the counter 206a/300 are filled. With reference to FIG. 7B, an example of the counter table 302 in the counter 206a/300 following multiple iterations of blocks 404-408 of the method 400 is illustrated. Continuing with the example of superblock 0 identified in the counter 206a/300 that had its bitmap field updated to the "1111 1111 1111 1110" bitmap as discussed above, the subsequent iterations of the method 400 may have detected the performance of 2 additional erase operations identifying P/E cycles on the superblock 0, and thus the bitmap field for superblock 0 may have been updated to a "1111 1111 1111 1100" bitmap following the second erase operation on the superblock 0, and then may have been updated to a "1111 1111 1111 1000" bitmap following the third erase operation on the superblock 0, as illustrated in FIG. 7B.

Similarly, the multiple iterations of the method 400 may have detected the performance of 15 erase operations identifying P/E cycles on the superblock 2, resulting in the bitmap field for superblock 2 identified in the counter 206a/300 having been updated to a "1000 0000 0000 0000" bitmap following the last of those erase operations, as illustrated in FIG. 7B. Similarly, the multiple iterations of the method 400 may have detected the performance of 1 erase operation identifying a P/E cycle on the superblock 3, resulting in the bitmap field for superblock 3 identified in the counter 206a/300 having been updated to a "1111 1111 1111 1110" bitmap following that erase operation, as illustrated in FIG. 7B. Similarly, the multiple iterations of the method 400 may have detected the performance of 2 erase operations identifying P/E cycles on the superblock 4, resulting in the bitmap field for superblock 4 identified in the counter 206a/300 having been updated to a "1111 1111 1111 1100" bitmap following the last of those erase operations, as illustrated in FIG. 7B. Similarly, the multiple iterations of the method 400 may have detected the performance of 14 erase operations identifying P/E cycles on the superblock N, resulting in the bitmap field for superblock N identified in the counter 206a/300 having been updated to a "1100 0000 0000 0000" bitmap following the last of those erase operations, as illustrated in FIG. 7B.

Similarly, the multiple iterations of the method 400 may have detected the performance of 16 erase operations identifying P/E cycles on the superblock 1, resulting in the bitmap field for superblock 1 identified in the counter 206a/300 having been updated to a "0000 0000 0000 0000" bitmap following the last of those erase operations, as illustrated in FIG. 7B. Furthermore, at decision block 408 and following the last erase operation that resulted in the bitmap field for superblock 1 having been updated to the "0000 0000 0000 0000" bitmap, the bitmap field capacity determination operations performed by the counter management engine 204 in the storage device 200 will determine that the bitmap field for the superblock 1 is full (e.g., the bitmap field for the superblock 1 identified in the counter 206a/300 has a "0000 0000 0000 0000" bitmap after 16 erase operations that identify 16 P/E cycles of the superblock 1, and thus cannot be updated in response to further erase operations).

If, at decision block 408, it is determined that the bitmap field for the storage element was filled, the method 400 proceeds to block 410 where the counter management subsystem converts the value field/bitmap field combinations in the first counter to first values. In an embodiment of block 410 and following the determination that a bitmap field in the counter 206a was filled at decision block 408, the counter management engine 204 in the storage device 200 may perform value field/bitmap field combination conversion operations that include converting each of the value field/bitmap field combinations in the counter table 302 in the counter 206a/300 to values. Continuing with the specific example provided above and with reference to FIG. 7B, the value field/bitmap field combination conversion operations may include the counter management engine 204 converting the "0" value in the value field and the "1111 1111 1111 1000" bitmap in the bitmap field for the superblock 0 to a "3" value (e.g., 0+3=3), converting the "0" value in the value field and the "0000 0000 0000 0000" bitmap in the bitmap field for the superblock 1 to a "16" value (e.g., 0+16=16), converting the "0" value in the value field and the "1000 0000 0000 0000" bitmap in the bitmap field for the superblock 2 to a "15" value (e.g., 0+15=15), converting the "0" value in the value field and the "1111 1111 1111 1110" bitmap in the bitmap field for the superblock 3 to a "1" value (e.g., 0+1=1), converting the "0" value in the value field and the "1111 1111 1111 1100" bitmap in the bitmap field for the superblock 4 to a "2" value (e.g., 0+2=2), and converting the "0" value in the value field and the "1100 0000 0000 0000" bitmap in the bitmap field for the superblock 2 to a "14" value (e.g., 0+14=14).

Figure 8B:
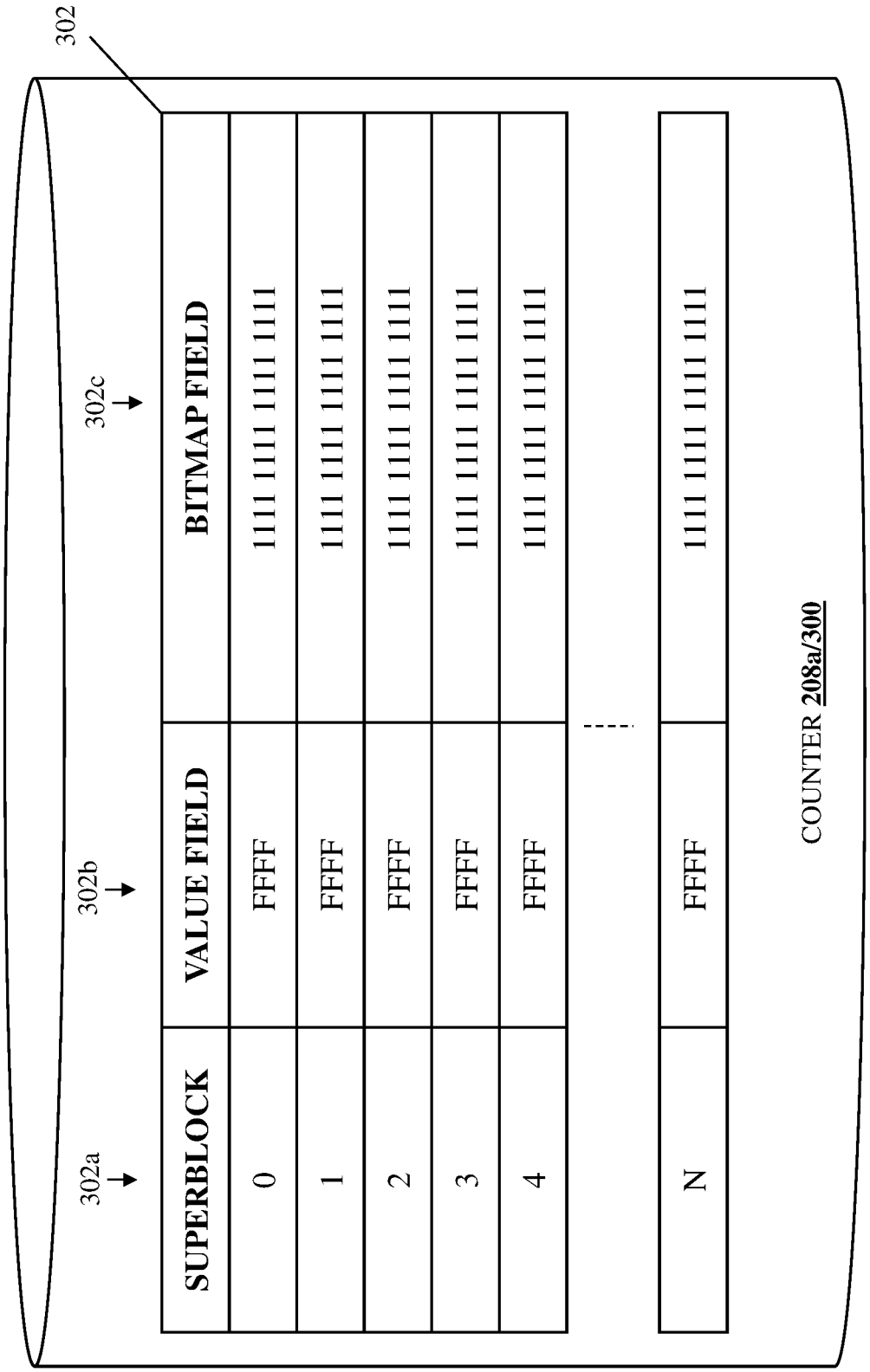
FIG. 8B is a schematic view illustrating the operation of the counter of FIG. 3 operating during the method of FIG. 5.

The method 400 then proceeds to block 412 where the counter management subsystem resets the second counter. With reference to FIG. 8A, in an embodiment of block 412, the counter management engine 204 in the storage device 200 may perform counter reset operations 800 that include resetting the counter 208a stored in the non-volatile memory subsystem 208. As discussed above, in examples in which the storage device 200 is "new", at block 412 the counter 208a stored in the non-volatile memory subsystem 208 may be "zeroed-out" or otherwise not in need of a reset (e.g., the counter 208a may be in the same state as it would be if it were reset), and thus block 412 may be skipped. However, in any situation in which the counter 208a stored in the non-volatile memory subsystem 208 is not "zeroed-out", the counter reset operations 800 may be performed to reset the counter 208a stored in the non-volatile memory subsystem 208. As such, while an initial iteration of block 412 of method 400 may not require any reset of the counter 208a stored in the non-volatile memory subsystem 208 (e.g., when the storage device 200 is new), as discussed below subsequent iterations of the method 400 will typically require reset of the counter 208a stored in the non-volatile memory subsystem 208. With reference to FIG. 8B, an embodiment of the counter 208a/300 following the counter reset operations 800 is illustrated. Similarly as described above for the counter 206a/300, following the counter reset operations 800, the respective value field for each of the superblocks 0-N identified by the counter 208a/300 includes a "FFFF" (or "65535") value, while the respective bitmap field for each of the superblocks 0-N identified by the counter 208a/300 includes a "1111 1111 1111 1111" bitmap.

Figure 9A:
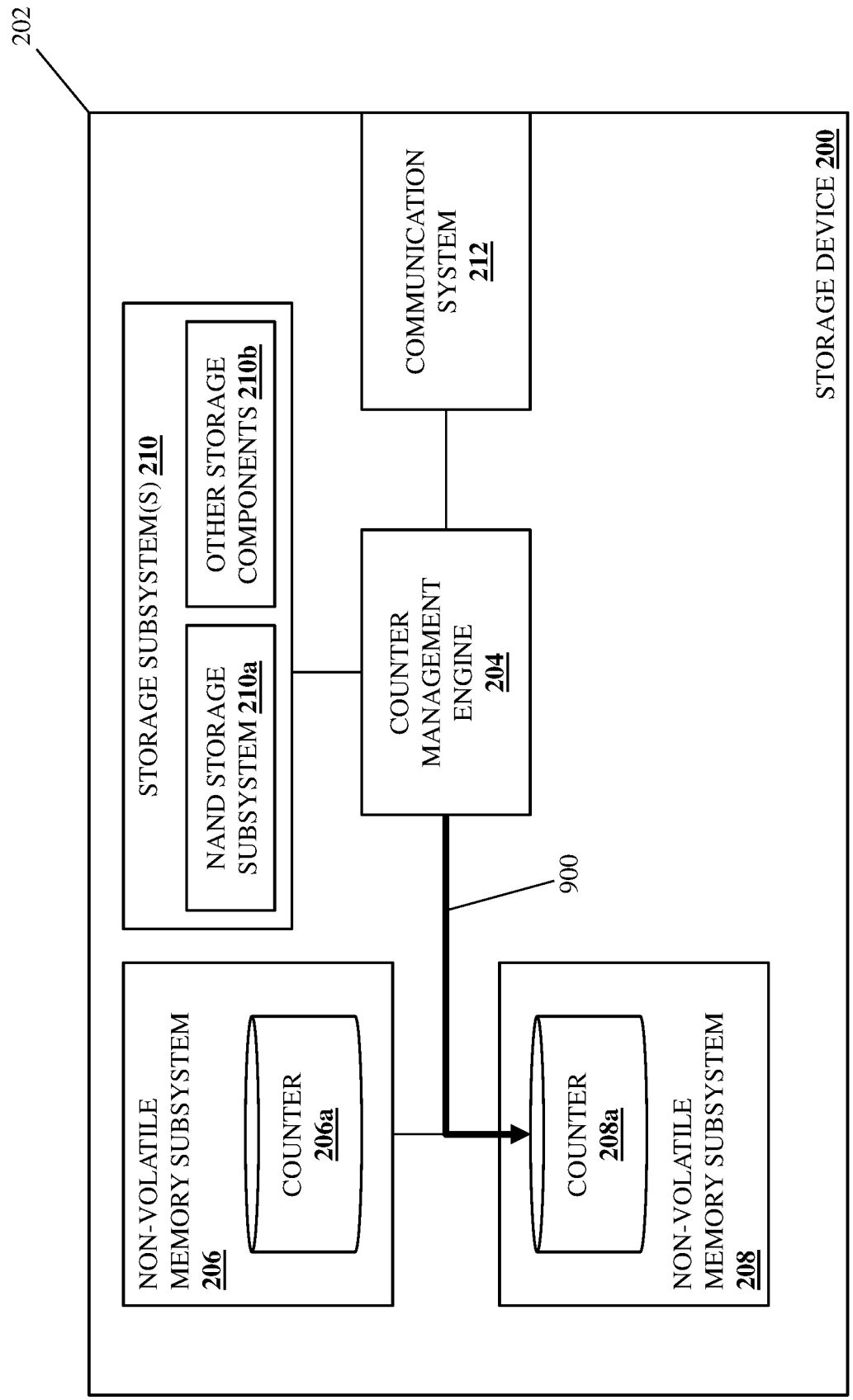
FIG. 9A is a schematic view illustrating an embodiment of the storage device of FIG. 2 operating during the method of FIG. 4.
Figure 9B:
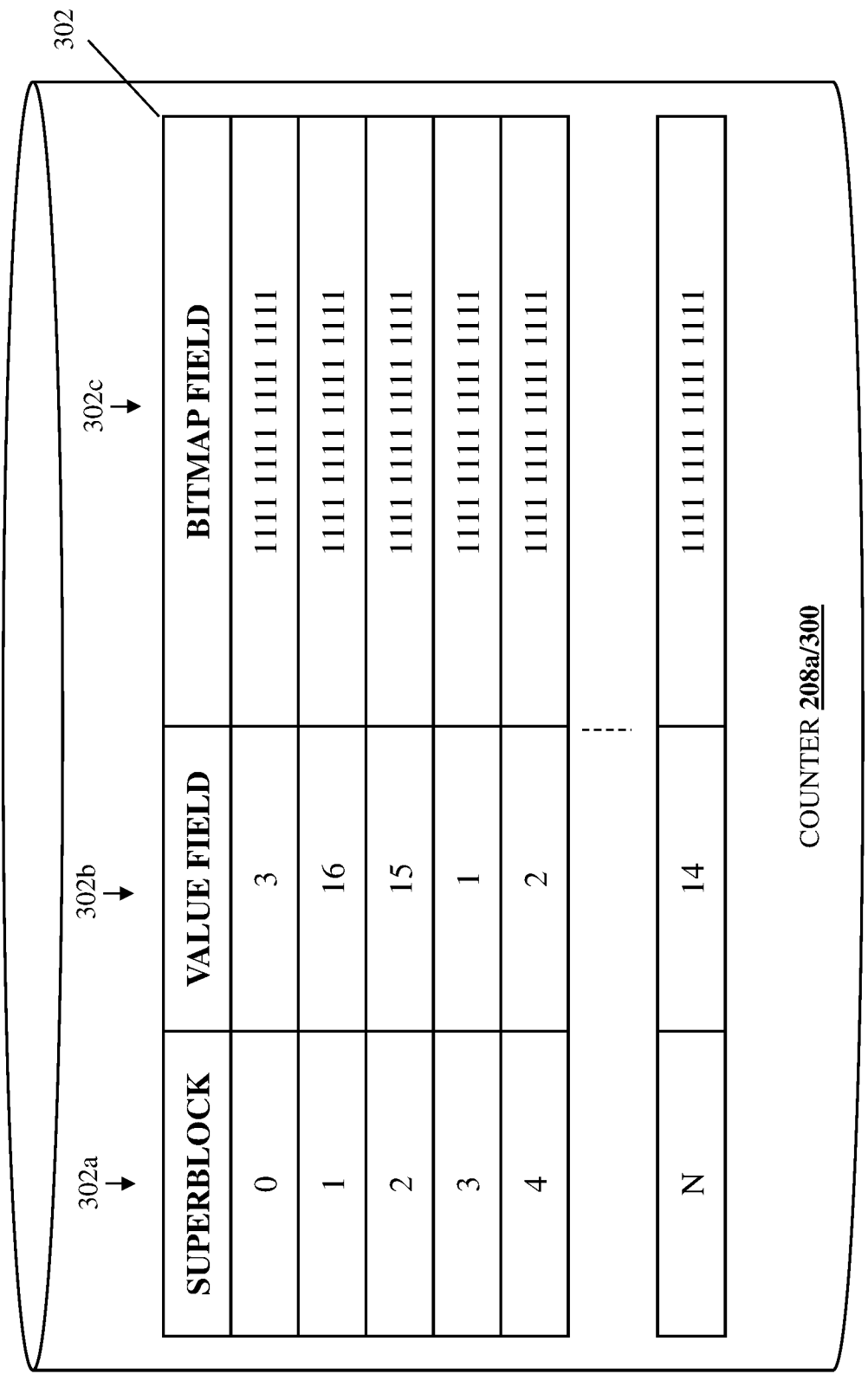
FIG. 9B is a schematic view illustrating the operation of the counter of FIG. 3 operating during the method of FIG. 5.

The method 400 then proceeds to block 414 where the counter management subsystem updates the value fields in the second counter with the first values. With reference to FIG. 9A, in an embodiment of block 414, the counter management engine 204 in the storage device 200 may perform value update operations 900 that include using the values converted from the value field/bitmap field combinations at block 410 to update the value fields (e.g., program those values fields to modify them from their "FFFF" (or "65535") state as discussed above) in the counter 208a/300. With reference to FIG. 9B and continuing with the specific example discussed above, the value storage operations 900 may include the counter management engine 204 using the "3" value (which was converted from the value field/bitmap field combination for the superblock 0 in the counter 206a/300) to update the value field for the superblock 0 identified in the counter 208a/300, using the "16" value (which was converted from the value field/bitmap field combination for the superblock 1 in the counter 206a/300) to update the value field for the superblock 1 identified in the counter 208a/300, using the "15" value (which was converted from the value field/bitmap field combination for the superblock 2 in the counter 206a/300) to update the value field for the superblock 2 identified in the counter 208a/300, using the "1" value (which was converted from the value field/bitmap field combination for the superblock 3 in the counter 206a/300) to update the value field for the superblock 3 identified in the counter 208a/300, using the "2" value (which was converted from the value field/bitmap field combination for the superblock 4 in the counter 206a/300) to update the value field for the superblock 4 identified in the counter 208a/300, and using the "14" value (which was converted from the value field/bitmap field combination for the superblock N in the counter 206a/300) to update the value field for the superblock N identified in the counter 208a/300.

As will be appreciated by one of skill in the art in possession of the present disclosure, immediately following block 414, the counter 206a/300 stored in the non-volatile memory subsystem 206 and illustrated in FIG. 7B and the counter 208a/300 stored in the non-volatile memory subsystem 208 and illustrated in FIG. 9B store identical storage device operating data, providing redundancy for the storage device operating data. For example, in event the non-volatile memory system 206 and/or counter 206a/300 subsequently becomes inaccessible, its data (or its data plus updated data, discussed in further detail below) will be available in the counter 208a/300 stored in the non-volatile memory system 208. In another example, in event the non-volatile memory system 208 and/or counter 208a/300 subsequently becomes inaccessible, all or a majority of its data (its data minus any updated data prior to it becoming inaccessible, discussed in further detail below) will be available in the counter 206a/300 stored in the non-volatile memory system 206. Thus, even in the event all of the values that were determined in order to update the counter 208a were lost, those values are available in the counter 206a and operate to provide a backup for those values that will not be more than 16 values off.

Figure 10:
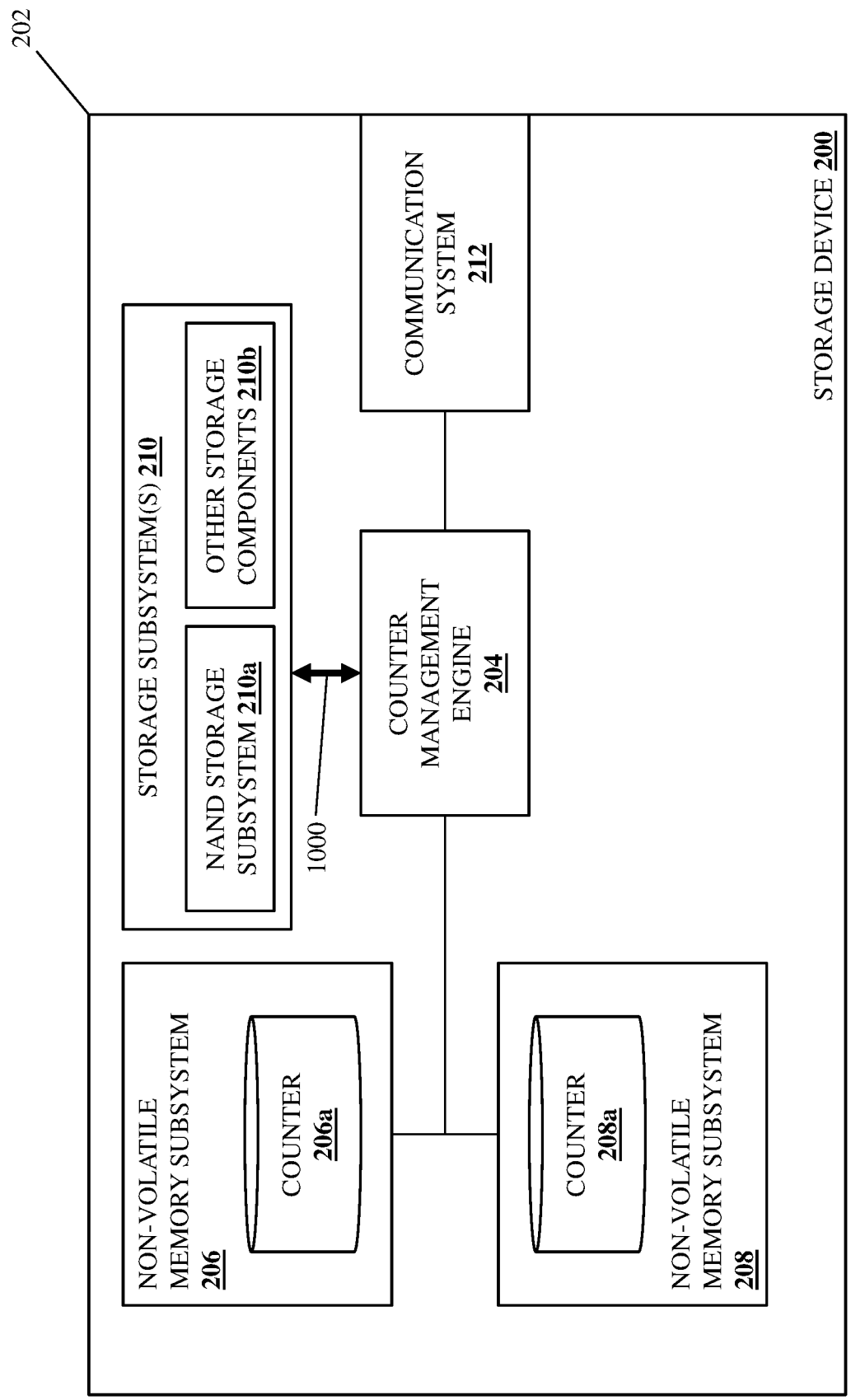
FIG. 10 is a schematic view illustrating an embodiment of the storage device of FIG. 2 operating during the method of FIG. 4.

The method 400 then proceeds to decision block 416 where it is determined whether the storage operation was performed on a storage element. With reference to FIG. 10, in an embodiment of decision block 416, the counter management engine 204 may perform storage subsystem monitoring operations 1000 that may include monitoring the storage subsystem(s) 210 in order to determine whether a storage operation was performed on a storage element. Continuing the example above in which the storage elements are provided by superblocks, the storage subsystem monitoring operations 1000 performed by the counter management engine 204 may include monitoring the NAND storage subsystem 210a to determine whether an erase operation that identifies a P/E cycle in a superblock has been performed. If, at decision block 416, it is determined that the storage operation was not performed on a storage element, the method 400 returns to decision block 416. As such, the method 400 may loop such that the counter management engine 204 continues to monitor for a storage operation on storage elements in the storage subsystem(s) 210 in the storage device until that storage operation is detected. Continuing with the specific example provided above, the counter management engine 204 may continue to monitor for an erase operation on superblocks in the NAND storage subsystem 210a in the storage device 200 until that erase operation, which identifies a P/E cycle for NAND blocks that define those superblocks, is detected.

Figure 11A:
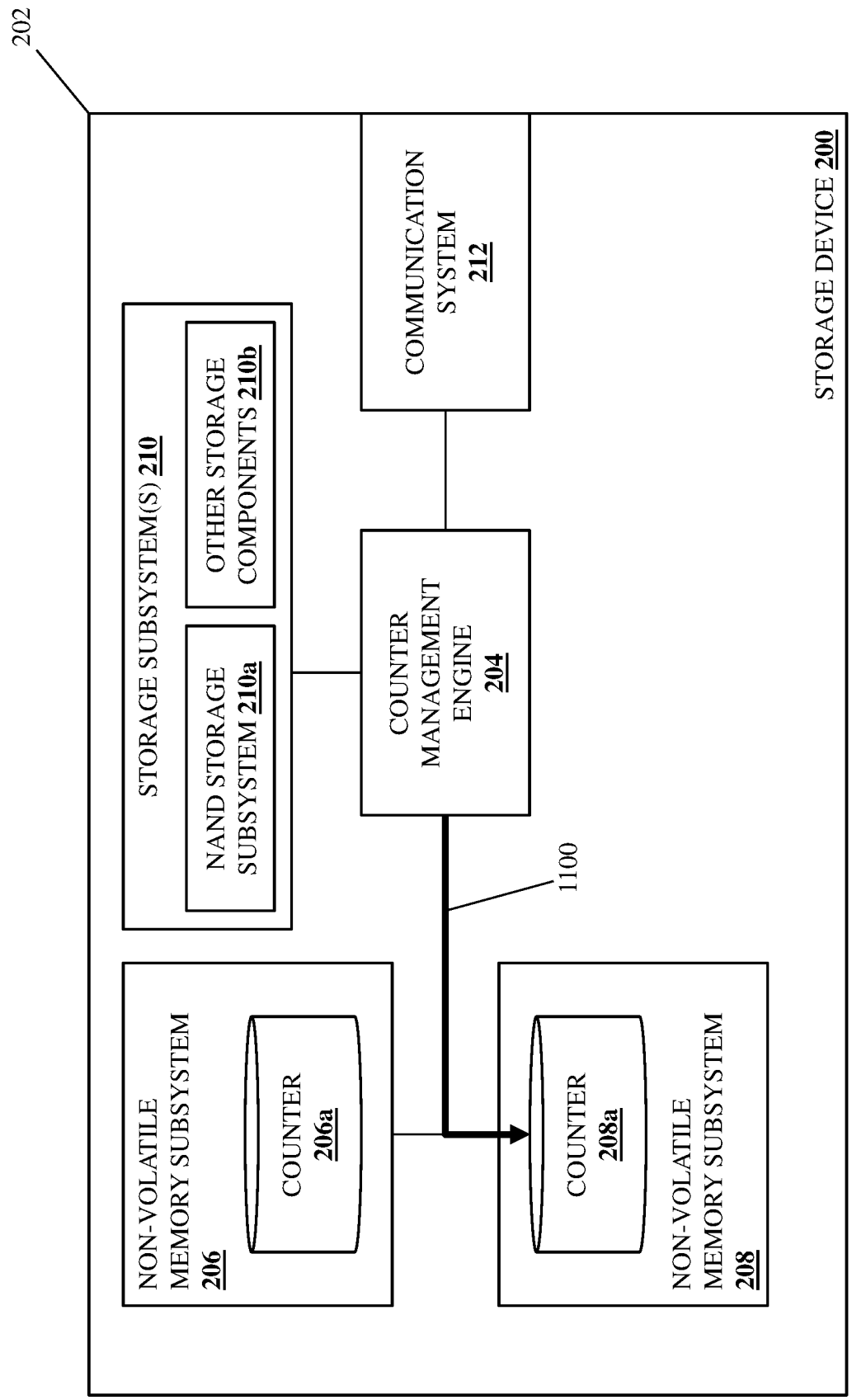
FIG. 11A is a schematic view illustrating an embodiment of the storage device of FIG. 2 operating during the method of FIG. 4.

If at decision block 416, it is determined that the storage operation was performed on a storage element, the method 400 proceeds to block 418 where the counter management subsystem updates a bitmap field for the storage element upon which the storage operation was performed in the second counter. With reference to FIG. 11A, in an embodiment of block 418, the counter management engine 204 in the storage device 200 may perform counter update operations 1100 that include updating the counter 208a by updating the respective bitmap field for the superblock upon which the erase operation identifying a P/E cycle was detected at decision block 416. To provide a specific example, consider superblock 0 identified in the counter 208a/300 with the bitmap field having the "1111 1111 1111 1111" bitmap illustrated in FIG. 9B, which as discussed above is the state of that bitmap field following reset and prior to any P/E cycles of superblock 0 subsequent to that reset. Similarly as described above, in the event an erase operation that identifies a P/E cycle is performed on the superblock 0 and detected at decision block 416, the counter update operations 1100 performed by the counter management engine 204 will include updating the bitmap field for the superblock 0 to a bitmap "1111 1111 1111 1110", i.e., changing the "last" bit in that bitmap field from a "1" to a "0".

The method 400 then proceeds to decision block 420 where it is determined whether the bitmap field for the storage element was filled. In an embodiment, at decision block 420 and following the updating of a bitmap field for the storage element upon which a storage operation was performed, the counter management engine 204 in the storage device 200 may perform bitmap field capacity determination operations that include determining whether the updating of that bitmap field has filled that bitmap field. Continuing the specific examples discussed above in which each bitmap field in the counter table 302 of the counter 208a/300 is a 2 byte/16 bit field, and similarly as described above, the bitmap field capacity determination operations performed by the counter management engine 204 may include determining whether the bitmap field includes a "0000 0000 0000 0000" bitmap, which as described herein will occur when erase operations that identify P/E cycles for the corresponding superblock have been performed 16 times subsequent to the resetting of that bitmap field (i.e., the bitmap field provided for any superblock will be filled after 16 P/E cycles of that superblock). However, while a specific example of bitmap fields with a capacity to identify 16 storage operations are described, one of skill in the art in possession of the present disclosure will appreciate that bitmap fields may be provided with capacity to identify more storage operations (32 storage operations, 64 storage operations, etc.) while remaining within the scope of the present disclosure as well.

Figure 11B:
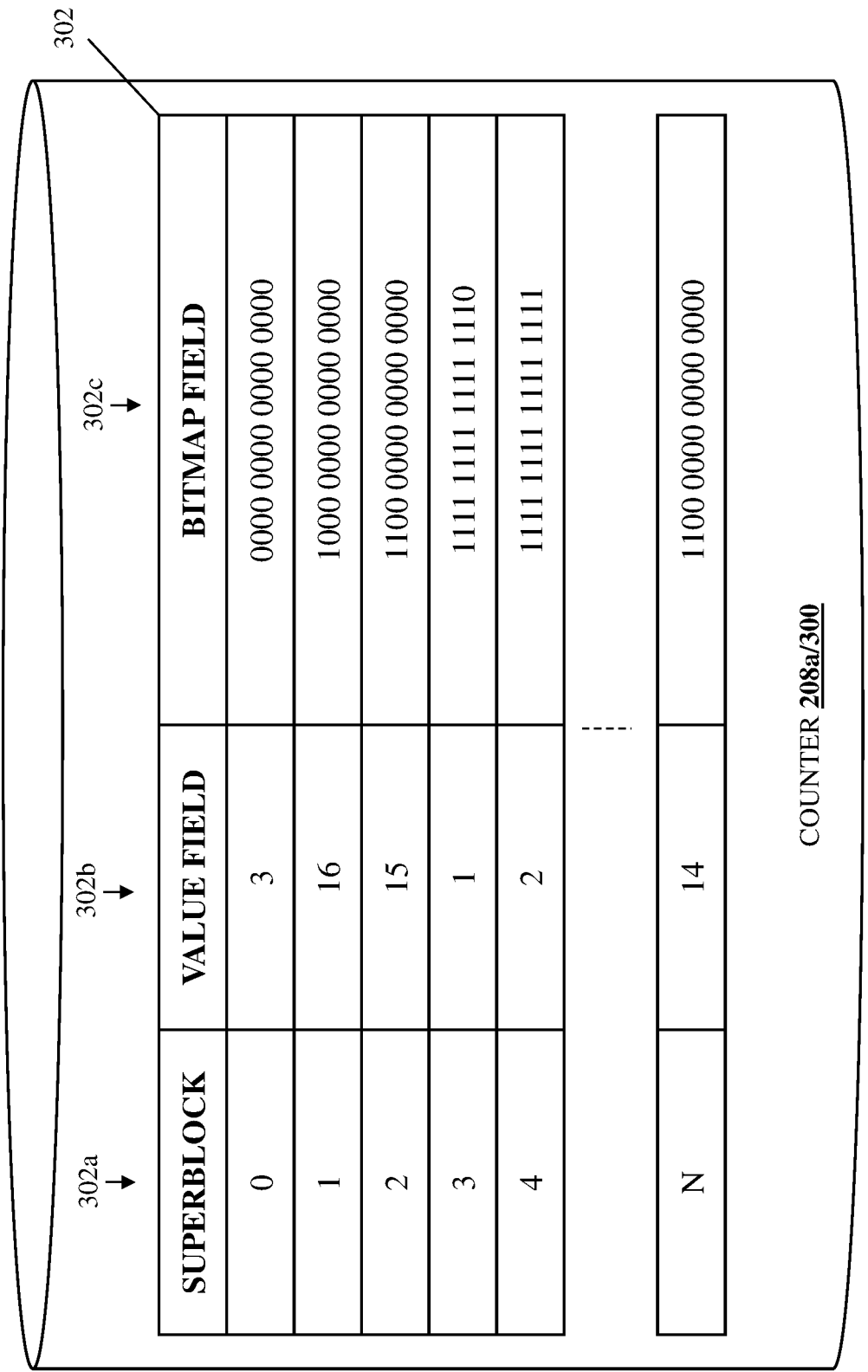
FIG. 11B is a schematic view illustrating the operation of the counter of FIG. 3 operating during the method of FIG. 5.

If, at decision block 420, it is determined that the bitmap field for the storage element was not filled, the method 400 returns to decision block 416. As such, the method 400 may loop such that the counter management engine 204 in the storage device 200 monitors for the storage operation on superblocks at decision block 416 and updates the bitmap field for any superblock upon which a storage operation is performed at block 418 as long as no bitmap fields in the counter table 302 in the counter 208a/300 are filled. With reference to FIG. 11B, an example of the counter table 302 in the counter 208a/300 following multiple iterations of blocks 416-420 of the method 400 is illustrated. For example, the multiple iterations of the method 400 may have detected the performance of 15 erase operations identifying P/E cycles on the superblock 1, resulting in the bitmap field for superblock 1 identified in the counter 208a/300 having been updated to a "1000 0000 0000 0000" bitmap following the last of those erase operations, as illustrated in FIG. 11B.

Similarly, the multiple iterations of the method 400 may have detected the performance of 14 erase operations identifying P/E cycles on the superblock 2, resulting in the bitmap field for superblock 2 identified in the counter 208a/300 having been updated to a "1100 0000 0000 0000" bitmap following the last of those erase operations, as illustrated in FIG. 11B. Similarly, the multiple iterations of the method 400 may have detected the performance of 1 erase operation identifying a P/E cycle on the superblock 3, resulting in the bitmap field for superblock 2 identified in the counter 208a/300 having been updated to a "1111 1111 1111 1110" bitmap following that erase operation, as illustrated in FIG. 11B. Similarly, the multiple iterations of the method 400 may have detected the performance of no erase operations identifying P/E cycles on the superblock 4, resulting in the bitmap field for superblock 4 identified in the counter 208a/300 remaining a "1111 1111 1111 1111" bitmap, as illustrated in FIG. 11B. Similarly, the multiple iterations of the method 400 may have detected the performance of 14 erase operations identifying P/E cycles on the superblock N, resulting in the bitmap field for superblock N identified in the counter 208a/300 having been updated to a "1100 0000 0000 0000" bitmap following the last of those erase operations, as illustrated in FIG. 11B.

Similarly, the multiple iterations of the method 400 may have detected the performance of 16 erase operations identifying P/E cycles on the superblock 0, resulting in the bitmap field for superblock 0 identified in the counter 208a/300 having been updated to a "0000 0000 0000 0000" bitmap following the last of those erase operations, as illustrated in FIG. 11B. Furthermore, at decision block 420 and following the erase operation that resulted in the bitmap field for superblock 0 identified in the counter 208a/300 having been updated to a "0000 0000 0000 0000" bitmap, the bitmap field capacity determination operations performed by the counter management engine 204 in the storage device 200 will determine that the bitmap field for the superblock 0 is full (e.g., the bitmap field for the superblock 0 has a "0000 0000 0000 0000" bitmap after 16 erase operations that identify 16 P/E cycles of the superblock 0, and thus cannot be updated in response to further erase operations).

If, at decision block 420, it is determined that the bitmap field for the storage element was filled, the method 400 proceeds to block 422 where the counter management subsystem converts the value field/bitmap field combinations in the second counter to second values. In an embodiment of block 422 and following the determination that a bitmap field in the counter 208a was filled at decision block 420, the counter management engine 204 in the storage device 200 may perform value field/bitmap field value combination conversion operations that include converting each of the value field/bitmap field combinations in the counter table 302 in the counter 208a/300 to values. Continuing with the specific example provided above and with reference to FIG. 11B, the bitmap field value conversion operations may include the counter management engine 204 converting the "3" value in the value field and the "0000 0000 0000 0000" bitmap in the bitmap field for the superblock 0 identified in the counter 208a/300 to a "19" value (e.g., 3+16=19), converting the "16" value in the value field and the "1000 0000 0000 0000" bitmap in the bitmap field for the superblock 1 identified in the counter 208a/300 to a "31" value (e.g., 16+15=31), converting the "15" value in the value field and the "1100 0000 0000 0000" bitmap in the bitmap field for the superblock 2 identified in the counter 208a/300 to a "29" value (e.g., 15+14=19), converting the "1" value in the value field and the "1111 1111 1111 1110" bitmap in the bitmap field for the superblock 3 identified in the counter 208a/300 to a "2" value (e.g., 1+1=2), converting the "2" value in the value field and the "1111 1111 1111 1111" bitmap in the bitmap field for the superblock 4 identified in the counter 208a/300 to a "2" value (e.g., 2+0=2), and converting the "14" value in the value field and the "1100 0000 0000 0000" bitmap in the bitmap field for the superblock 2 to a "28" value (e.g., 14+14=28).

Figure 12A:
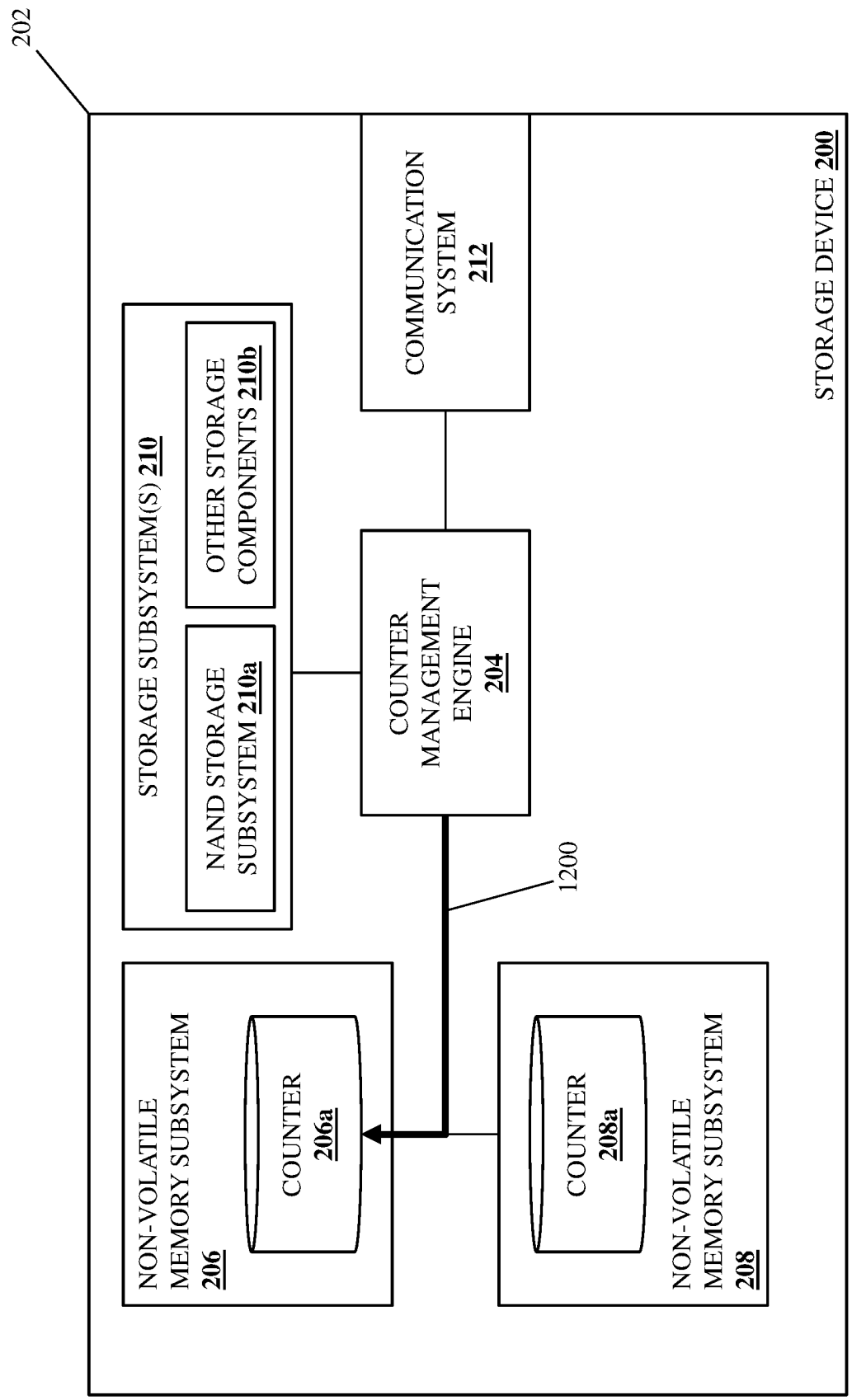
FIG. 12A is a schematic view illustrating an embodiment of the storage device of FIG. 2 operating during the method of FIG. 4.
Figure 12B:
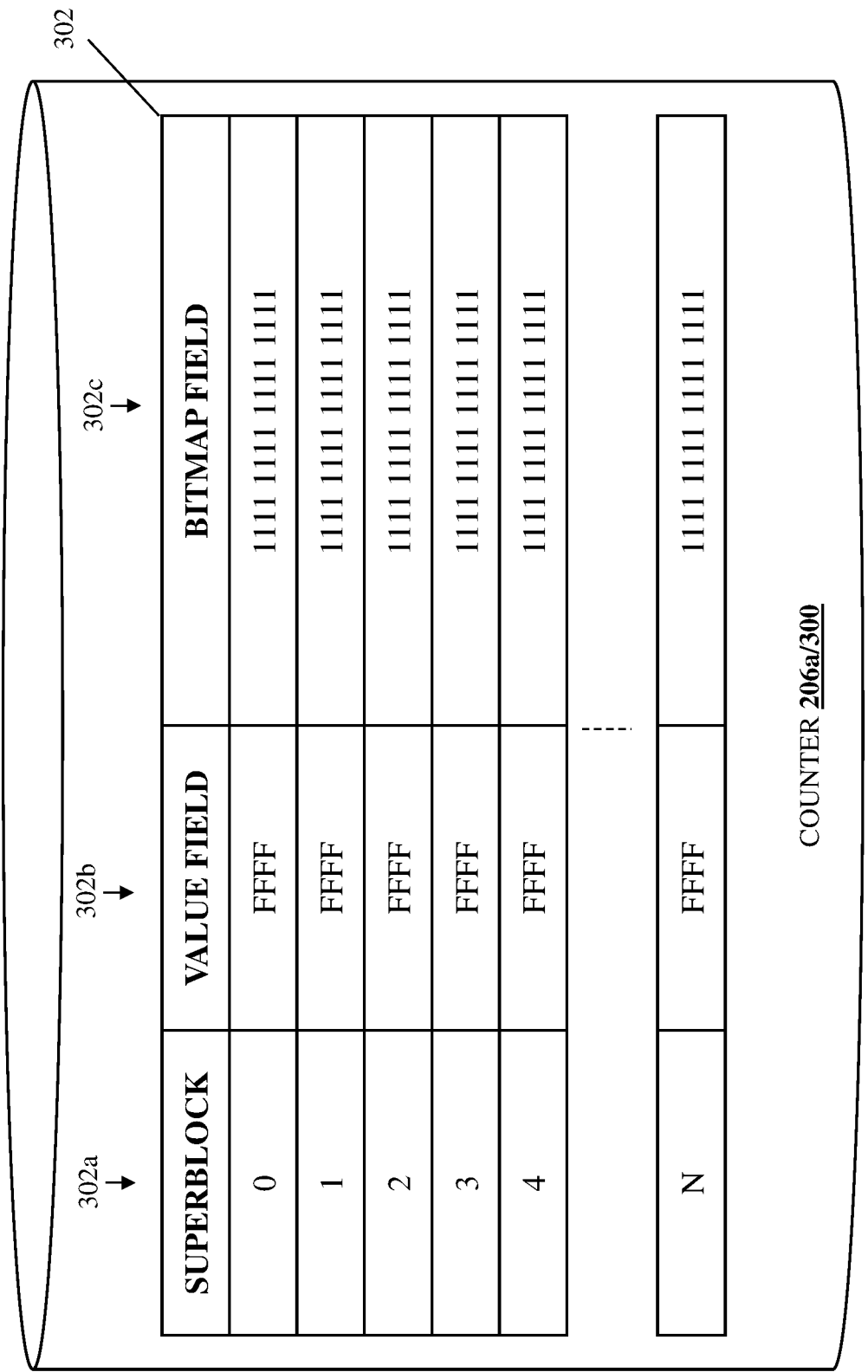
FIG. 12B is a schematic view illustrating the operation of the counter of FIG. 3 operating during the method of FIG. 5.

The method 400 then proceeds to block 424 where the counter management subsystem resets the first counter. With reference to FIG. 12A, in an embodiment of block 424, the counter management engine 204 in the storage device 200 may perform counter reset operations 1200 that include resetting the counter 206a stored in the non-volatile memory subsystem 206. With reference to FIG. 12B, an embodiment of the counter 206a/300 following the counter reset operations 1200 is illustrated. Similarly as described above, following the counter reset operations 1200, the respective value field for each of the superblocks 0-N identified by the counter 206a/300 includes a "FFFF" (or "65535") value, while the respective bitmap field for each of the superblocks 0-N identified by the counter 206a/300 includes a "1111 1111 1111 1111" bitmap.

Figure 13A:
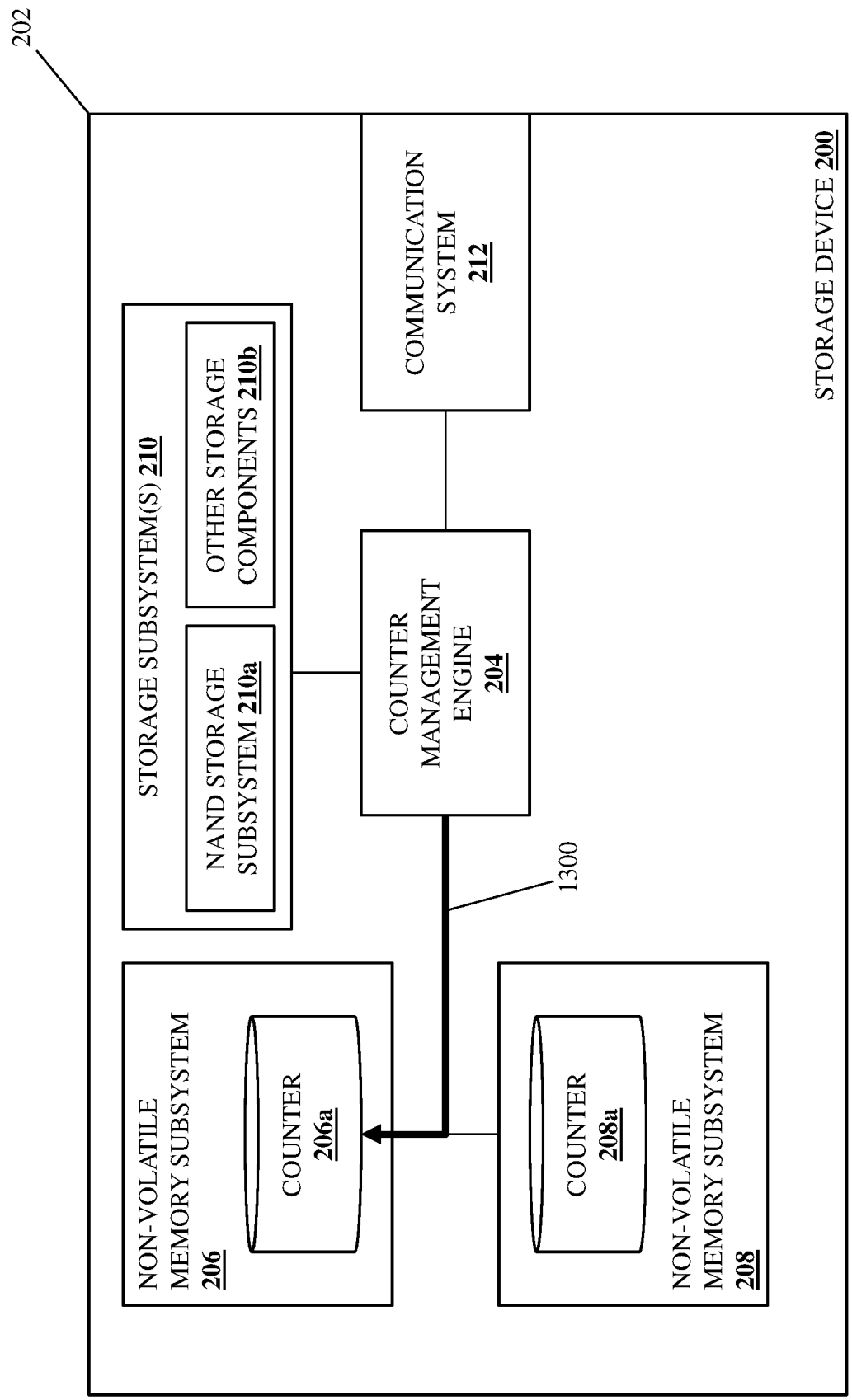
FIG. 13A is a schematic view illustrating an embodiment of the storage device of FIG. 2 operating during the method of FIG. 4.

The method 400 then proceeds to block 426 where the counter management subsystem updates the value fields in the first counter with the second values. With reference to FIG. 13A, in an embodiment of block 426, the counter management engine 204 in the storage device 200 may perform value update operations 1300 that include using the values converted from the value field/bitmap field combinations at block 422 to update the value fields in the counter 206a/300. Continuing with the specific example discussed above, the value storage operations 1300 may include the counter management engine 204 using the "19" value (which was converted from the value field/bitmap field combination for the superblock 0 in the counter 208a/300) to update the value field for the superblock 0 in the counter 206a/300, using the "31" value (which was converted from the value field/bitmap field combination for the superblock 1 in the counter 208a/300) to update the value field for the superblock 1 in the counter 206a/300, using the "29" value (which was converted from the value field/bitmap field combination for the superblock 2 in the counter 208a/300) to update the value field for the superblock 2 in the counter 206a/300b, using the "2" value (which was converted from the value field/bitmap field combination for the superblock 3 in the counter 208a/300) to update the value field for the superblock 3 in the counter 206a/300, using the "2" value (which was converted from the value field/bitmap field combination for the superblock 4 in the counter 208a/300) to update the value field for the superblock 4 in the counter 206a/300, and using the "28" value (which was converted from the value field/bitmap field combination for the superblock N in the counter 208a/300) to update the value field for the superblock N in the counter 206a/300.

Figure 13B:
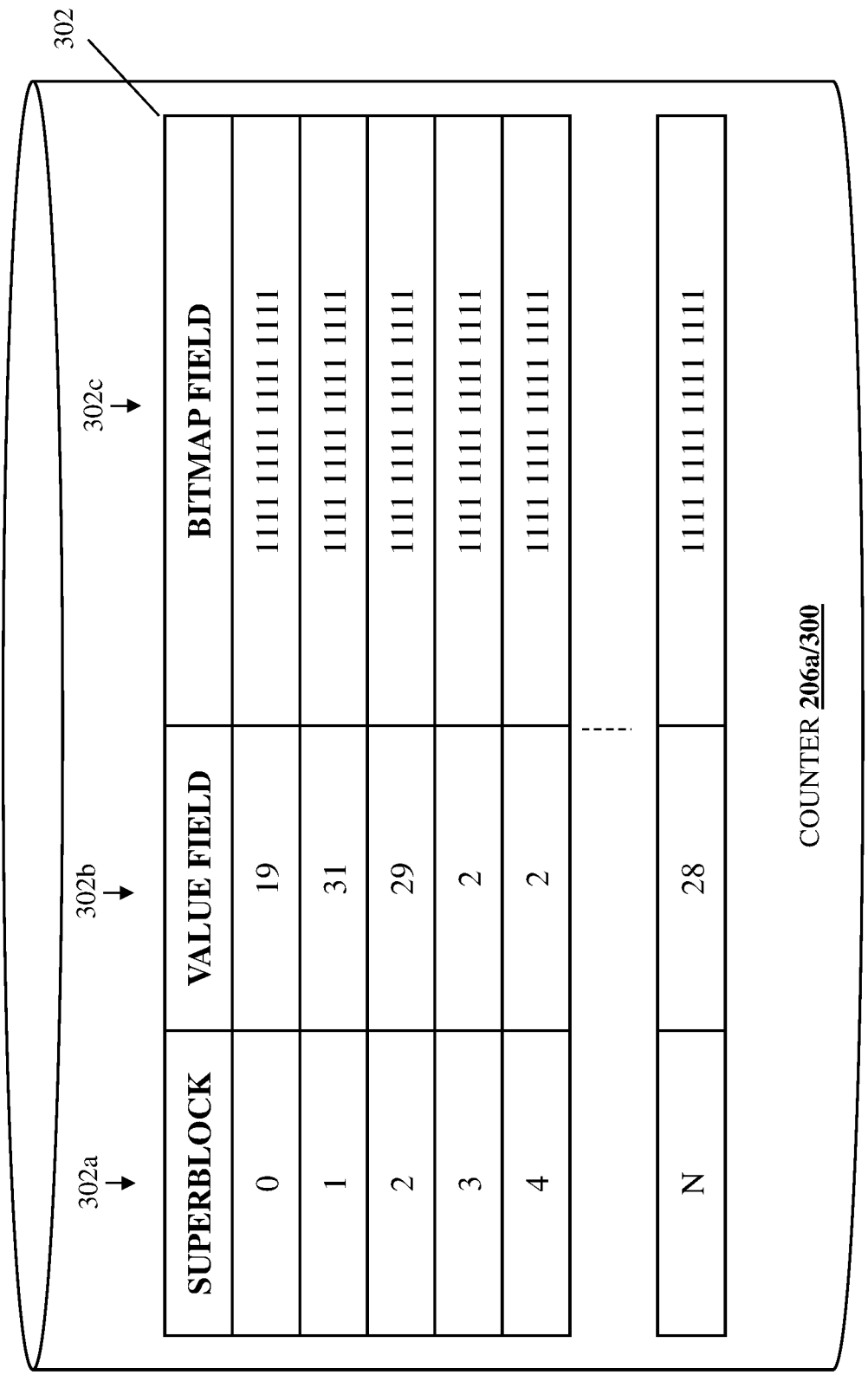
FIG. 13B is a schematic view illustrating the operation of the counter of FIG. 3 operating during the method of FIG. 5.

As will be appreciated by one of skill in the art in possession of the present disclosure, immediately following block 426, the counter 208a/300 stored in the non-volatile memory subsystem 208 and illustrated in FIG. 11B and the counter 206a/300 stored in the non-volatile memory subsystem 206 and illustrated in FIG. 13B store identical storage device operating data, providing redundancy for the storage device operating data. For example, in event the non-volatile memory system 208 and/or counter 208a/300 subsequently becomes inaccessible, its data (or its data plus updated data, discussed in further detail below) will be available in the counter 206a/300 stored in the non-volatile memory system 206. In another example, in event the non-volatile memory system 206 and/or counter 206a/300 subsequently becomes inaccessible, all or a majority of its data (its data minus any updated data prior to it becoming inaccessible, discussed in further detail below) will be available in the counter 208a/300 stored in the non-volatile memory system 208.

Figure 14:
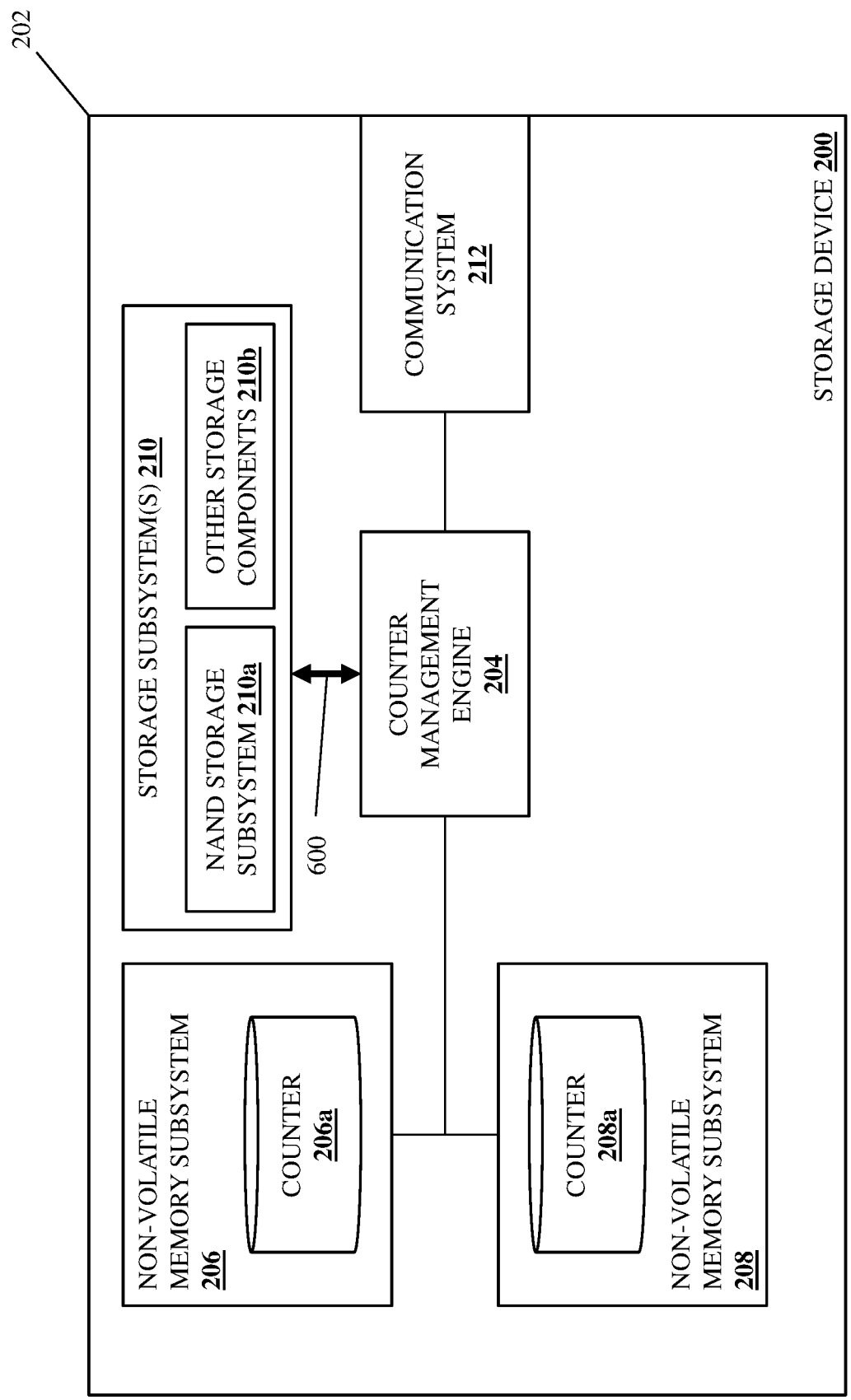
FIG. 14 is a schematic view illustrating an embodiment of the storage device of FIG. 2 operating during the method of FIG. 4.
Figure 15A:
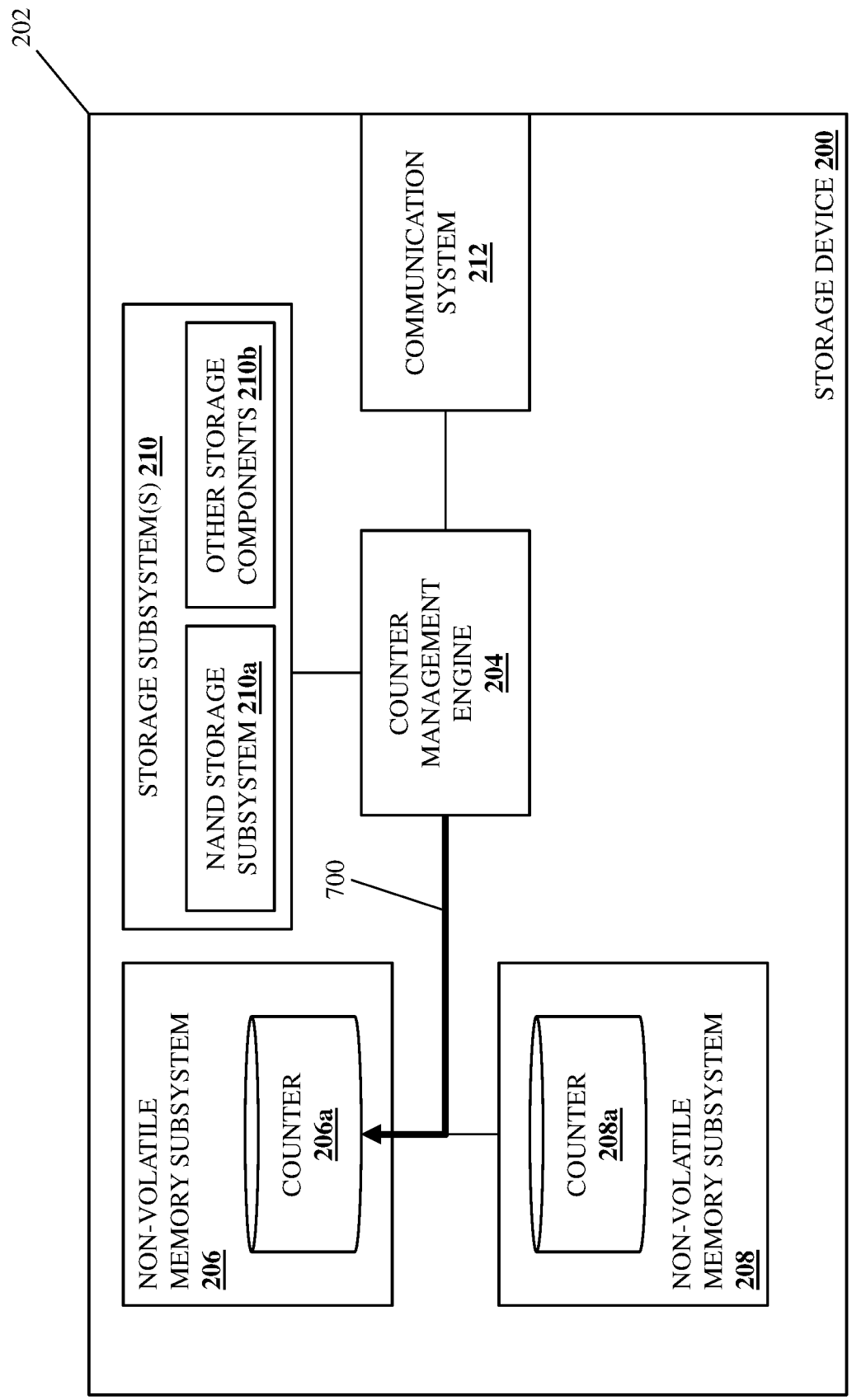
FIG. 15A is a schematic view illustrating an embodiment of the storage device of FIG. 2 operating during the method of FIG. 4.
Figure 15B:
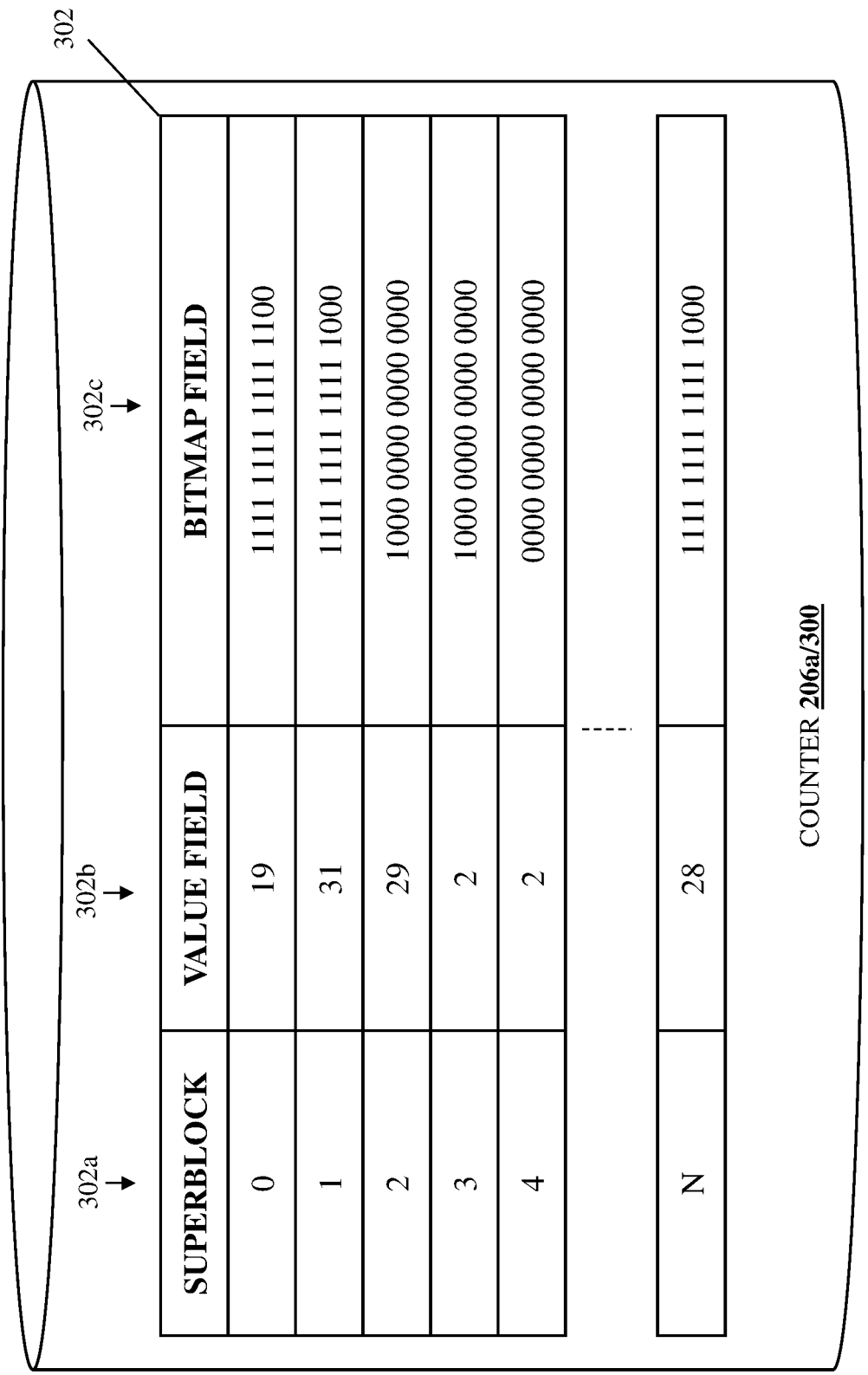
FIG. 15B is a schematic view illustrating the operation of the counter of FIG. 3 operating during the method of FIG. 5.

The method 400 then returns to decision block 404. As such, the method 400 may loop such that the counters 206a/300 and 208a/300 are updated in a manner substantially similarly as described above. For example, FIG. 14 illustrates the counter management engine 204 in the storage device 200 again performing the storage subsystem monitoring operations 600 at decision block 404 substantially as described above, while FIG. 15A illustrates the counter management engine 204 in the storage device 200 again performing the counter update operations 700 at block 406 substantially as described above (and in response to detecting the storage operation at decision block 404). With reference to FIG. 15B, an example of the counter table 302 in the counter 208a/300 following multiple further iterations of blocks 404-408 of the method 400 is illustrated. For example, the multiple further iterations of the method 400 may have detected the performance of 2 erase operations identifying P/E cycles on the superblock 0, resulting in the bitmap field for superblock 0 identified in the counter 206a/300 having been updated to a "1111 1111 1111 1100" bitmap following the last of those erase operations, as illustrated in FIG. 15B.

Similarly, the multiple iterations of the method 400 may have detected the performance of 3 erase operations identifying P/E cycles on the superblock 1, resulting in the bitmap field for superblock 1 identified in the counter 206a/300 having been updated to a "1111 1111 1111 1000" bitmap following the last of those erase operations, as illustrated in FIG. 15B. Similarly, the multiple iterations of the method 400 may have detected the performance of 15 erase operations identifying a P/E cycle on the superblock 2, resulting in the bitmap field for superblock 2 identified in the counter 206a/300 having been updated to a "1000 0000 0000 0000" bitmap following the last of those erase operations, as illustrated in FIG. 15B. Similarly, the multiple iterations of the method 400 may have detected the performance of 15 erase operations identifying a P/E cycle on the superblock 3, resulting in the bitmap field for superblock 3 identified in the counter 206a/300 having been updated to a "1000 0000 0000 0000" bitmap following the last of those erase operations, as illustrated in FIG. 15B. Similarly, the multiple iterations of the method 400 may have detected the performance of 3 erase operations identifying P/E cycles on the superblock N, resulting in the bitmap field for superblock N identified in the counter 206a/300 having been updated to a "1111 1111 1111 1000" bitmap following the last of those erase operations, as illustrated in FIG. 15B.

Similarly, the multiple iterations of the method 400 may have detected the performance of 16 erase operations identifying P/E cycles on the superblock 4, resulting in the bitmap field for superblock 4 identified in the counter 206a/300 having been updated to a "0000 0000 0000 0000" bitmap following the last of those erase operations, as illustrated in FIG. 15B. Furthermore, at decision block 408 and following the erase operation that resulted in the bitmap field for superblock 4 identified in the counter 206a/300 having been updated to a "0000 0000 0000 0000" bitmap, the bitmap field capacity determination operations performed by the counter management engine 204 in the storage device 200 will determine that the bitmap field for the superblock 4 is full (e.g., the bitmap field for the superblock 4 has a "0000 0000 0000 0000" bitmap after 16 erase operations that identify 16 P/E cycles of the superblock 4, and thus cannot be updated in response to further erase operations).

At block 410 and following the determination that a bitmap field in the counter 206a was filled at decision block 408, the counter management engine 204 in the storage device 200 may again perform value field/bitmap field combination conversion operations that include converting each of the value field/bitmap field combinations in the counter table 302 in the counter 206a/300 to values substantially similarly as described above. Continuing with the specific example provided above and with reference to FIG. 15B, the bitmap field value conversion operations may include the counter management engine 204 converting the "19" value in the value field and the "1111 1111 1111 1100" bitmap in the bitmap field for the superblock 0 identified in the counter 206a/300 to a "21" value (e.g., 19+2=21), converting the "31" value in the value field and the "1111 1111 1111 1000" bitmap in the bitmap field for the superblock 1 identified in the counter 206a/300 to a "34" value (e.g., 31+3=34), converting the "29" value in the value field and the "1000 0000 0000 0000" bitmap in the bitmap field for the superblock 2 identified in the counter 206a/300 to a "44" value (e.g., 29+15=44), converting the "2" value in the value field and the "1000 0000 0000 0000" bitmap in the bitmap field for the superblock 3 identified in the counter 206a/300 to a "17" value (e.g., 2+17=19), converting the "2" value in the value field and the "0000 0000 0000 0000" bitmap in the bitmap field for the superblock 4 identified in the counter 206a/300 to a "18" value (e.g., 2+16=18), and converting the "28" value in the value field and the "1111 1111 1111 1000" bitmap in the bitmap field for the superblock 2 identified in the counter 206a/300 to a "30" value (e.g., 28+3=31).

Figure 16A:
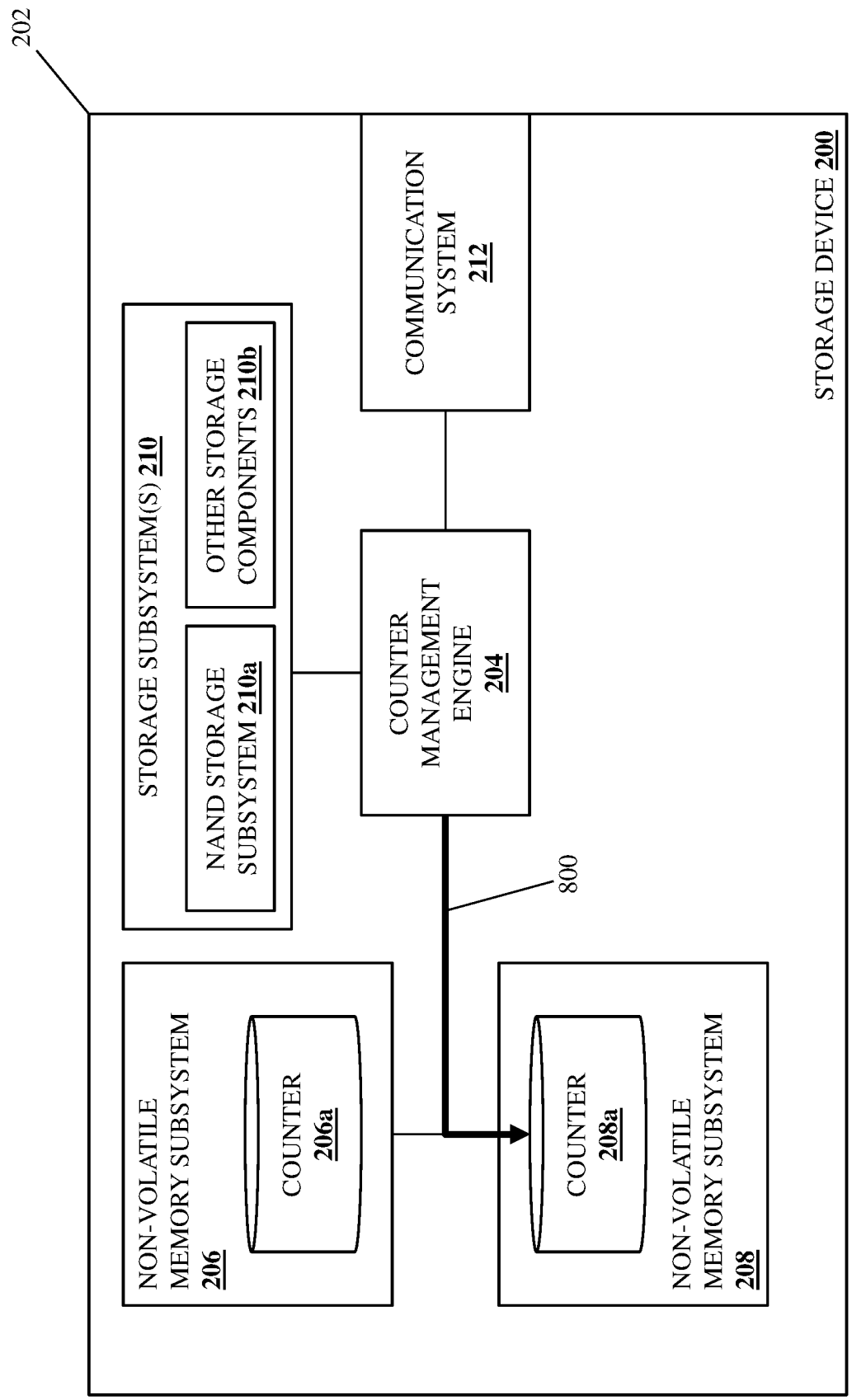
FIG. 16A is a schematic view illustrating an embodiment of the storage device of FIG. 2 operating during the method of FIG. 4.
Figure 16B:
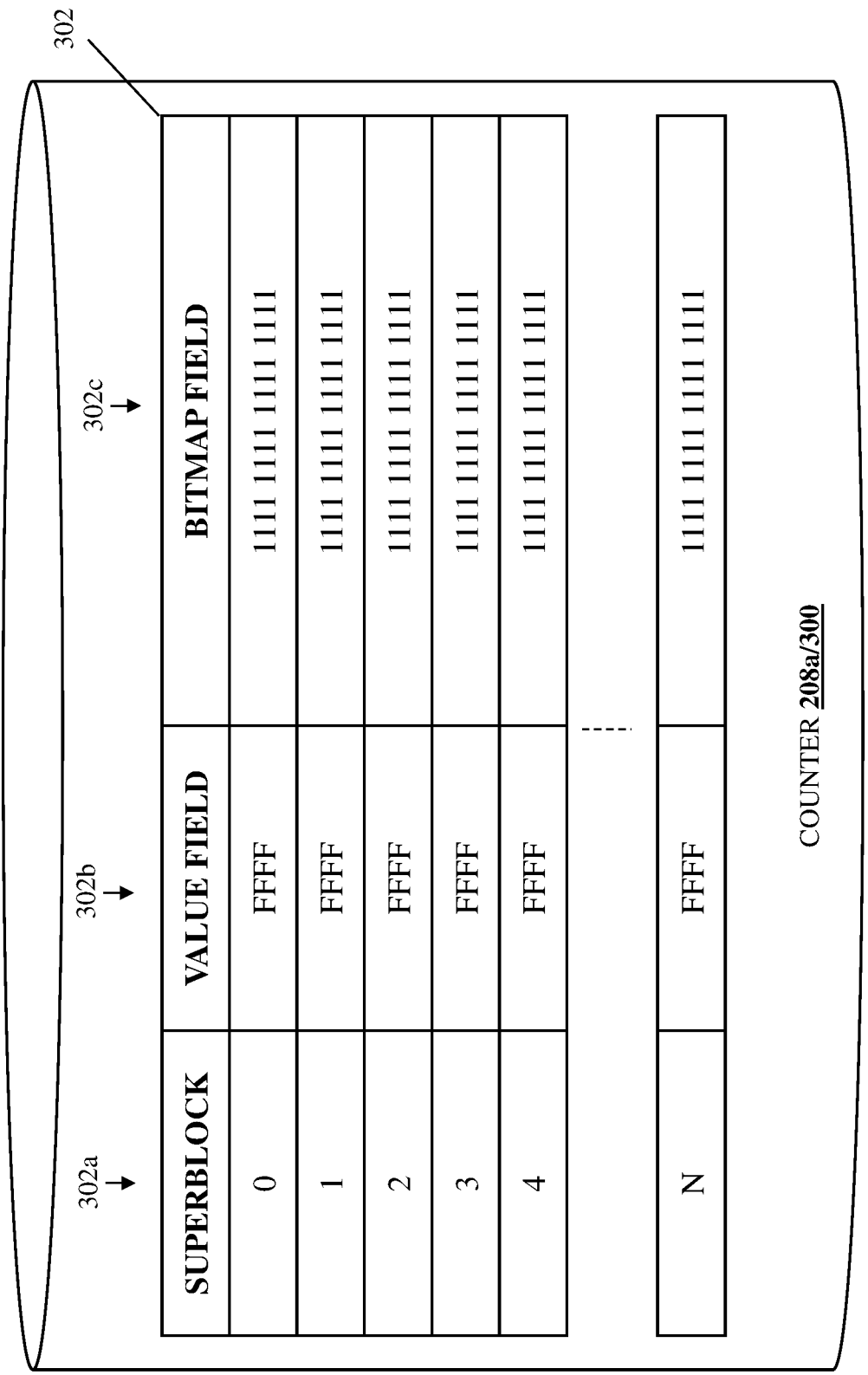
FIG. 16B is a schematic view illustrating the operation of the counter of FIG. 3 operating during the method of FIG. 5.
Figure 17A:
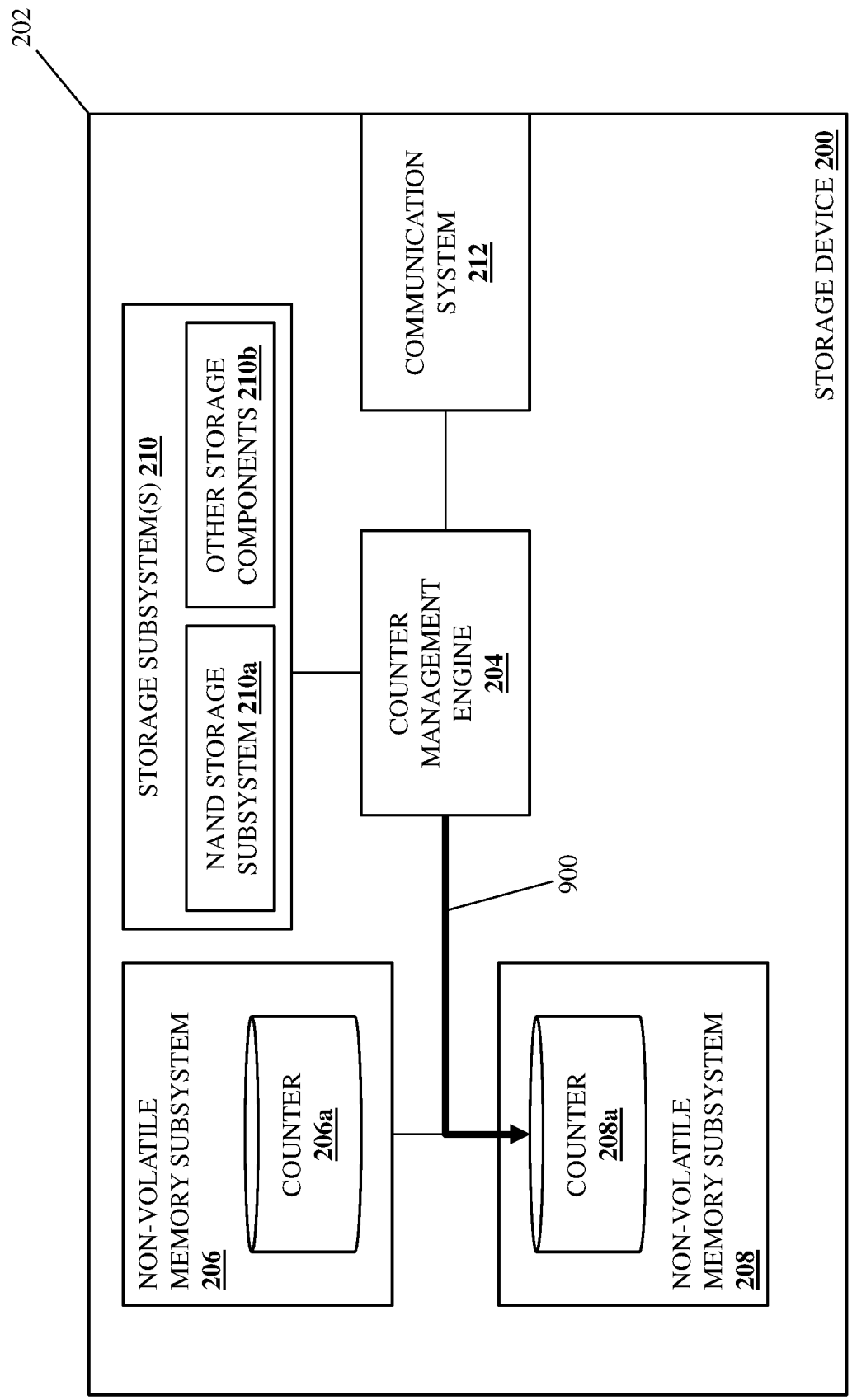
FIG. 17A is a schematic view illustrating an embodiment of the storage device of FIG. 2 operating during the method of FIG. 4.
Figure 17B:
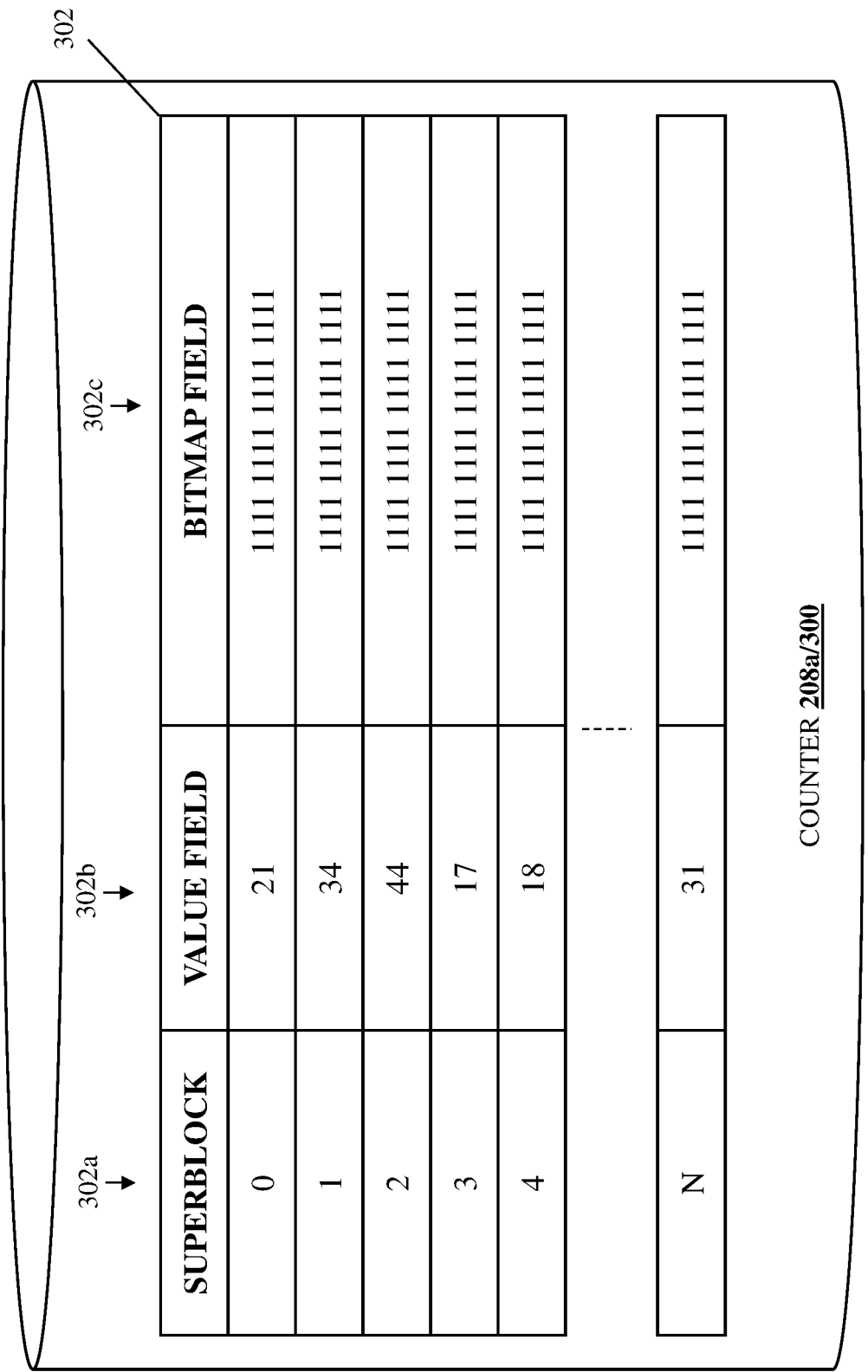
FIG. 17B is a schematic view illustrating the operation of the counter of FIG. 3 operating during the method of FIG. 5.

FIG. 16A illustrates the counter management engine 204 in the storage device 200 again performing the counter reset operations 800 at block 412 substantially as described above, with FIG. 16B illustrating the counter 208a/300 following that reset. FIG. 17A illustrates the counter management engine 204 in the storage device 200 again performing the value update operations 900 at block 412 substantially as described above.

Continuing with the specific example discussed above, the value storage operations 900 may include the counter management engine 204 using the "21" value (which was converted from the value field/bitmap field combination for the superblock 0 in the counter 206a/300) to update the value field for the superblock 0 in the counter 208a/300, using the "34" value (which was converted from the value field/bitmap field combination for the superblock 1 in the counter 206a/300) to update the value field for the superblock 1 in the counter 208a/300, using the "44" value (which was converted from the value field/bitmap field combination for the superblock 2 in the counter 206a/300) to update the value field for the superblock 2 in the counter 208a/300b, using the "19" value (which was converted from the value field/bitmap field combination for the superblock 3 in the counter 206a/300) to update the value field for the superblock 3 in the counter 208a/300, using the "18" value (which was converted from the value field/bitmap field combination for the superblock 4 in the counter 206a/300) to update the value field for the superblock 4 in the counter 208a/300, and using the "31" value (which was converted from the value field/bitmap field combination for the superblock N in the counter 206a/300) to update the value field for the superblock N in the counter 208a/300.

As will be appreciated by one of skill in the art in possession of the present disclosure, while two updates of the counter 206a/300 (e.g., the "first" counter) and one update of the counter 208a (e.g., the "second" counter) have been described, one of skill in the art in possession of the present disclosure will appreciate how the description above may be followed by an update of the second counter, followed by an update of the first counter, and so on throughout the lifetime of the storage device 200. Furthermore, one of skill in the art in possession of the present disclosure will recognize how, at any time, the counter management engine 204 in the storage device 200 may be utilized (e.g., by a host system such as an operating system or application running on the computing device in which the storage device 200 is located) to retrieve the most current operating data stored in the counters 206a/300 or 208a/300. For example, in response to a request for current operating data, the counter management engine 204 may identify which of the counters 206a/300 or 208a/300 is currently being utilized to update the operating data, and then convert the value field/bitmap field combinations for each superblock into corresponding values that may be returned as the requesting operating data. However, while a specific access of the data tracked by the counters 206a/300 and 208a/300 is described, one of skill in the art in possession of the present disclosure will appreciate how the data tracked by the counters 206a/300 and 208a/300 may be accessed in a variety of manners that will fall within the scope of the present disclosure as well.

To provide an example of just some of the benefits of the present disclosure, consider the "down counter" technique used in conventional storage device counter systems discussed above in which each erase operation performed on a superblock is tracked via a bit (e.g., a "1") in the counter, which as discussed above consumes a relatively large amount of storage space. In the example provided above for superblocks made up of NAND blocks with expected P/E cycle lifetimes of 8000 P/E cycles, each superblock requires [8000 P/E cycles*1/(8 bits/byte)=]1000 bytes of counter storage space per superblock, and for a 4 TB capacity SSD storage device with 2048 superblocks, a single copy of the counter will require [1000*2048=]~2 MB of storage space. To contrast, embodiments of the systems and methods of the present disclosure like those in the examples above that utilize 4 bytes for each superblock would require [2048 superblocks*4 bytes*2 copies/counters=] 16 KB of storage space. Furthermore, the systems and methods of the present disclosure are scalable to handle higher P/E cycle SSD storage devices with the need for increased non-volatile memory space, as the non-volatile memory space utilized for the systems and methods of the present disclosure may remain fixed (e.g., for P/E cycles below [65535+16=] 65551).

Some embodiments of the present disclosure may provide "generation" information associated with any counter table, with that generation information configured to allow the storage device or host device connected thereto to identify (e.g., upon initialization or in other scenarios that would be apparent to one of skill in the art in possession of the present disclosure) the most recent version of the counter table to use in tracking the storage device operating data. Furthermore, other embodiments of the present disclosure may instead determine (e.g., upon initialization or in other scenarios that would be apparent to one of skill in the art in possession of the present disclosure) the "newest" counter table to use in tracking the storage device operating data by, for example, identifying the counter table with the highest values (e.g., because many embodiments of the counter tables of the present disclosure will only increase over the lifetime of the storage device).

Thus, systems and methods have been described that utilize a hybrid value field/bitmap field counting technique for tracking operating data generated in response to operations performed on elements in a device in order to reduce the amount of space needed to track such operating data, while also ensuring operating data redundancy. For example, the counter system of the present disclosure may include a counter management subsystem, a storage subsystem having storage elements, and a non-volatile memory system storing a first counter including a first value field/first bitmap field combination for each storage element, and a second counter including a second value field/second bitmap field combination for each storage element. The counter management subsystem resets the first counter and, following each storage operation on a storage element, updates a bit in the first bitmap field for that storage element. When one of the first bitmap fields is filled, the counter management subsystem converts each first bitmap field to a respective first value for each storage element, resets the second counter, stores the respective first value for each storage element in the second value field for each storage element and, following each storage operation on a storage element, updates a bit in the second bitmap field for that storage element.

As such, the space needed to track operating data generated by storage devices is greatly reduced while also being protected in the event of memory corruption or power loss, as operating data may be stored in redundant non-volatile memory system, with volatile memory systems (e.g., Dual Data Rate (DDR) memory devices) only utilized for the code/algorithms needed to convert the value field/bitmap field combinations to values as described above in some embodiments. However, other embodiments may store copies of the values in volatile memory systems, with the storage device operating data counter system discussed above utilized to save those values across power cycles. Thus, the storage device operating data techniques described above reduce the chances of losing storage device operating data in the event of a power loss, as in a worst-case scenario, power will be lost during the update of a bitmap field, in which case a single performance of the storage operation will not be recorded. Furthermore, in the event of a power loss or firmware event that ceases operation of the storage device, any counter data will be left in its pre-programmed state or post-programmed state and without corruption (e.g., in the event an 8-bit value was being programmed and only 4 bits had been programmed prior to the power loss or firmware event).

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A storage device operating data counter system, comprising:
    at least one storage subsystem including a plurality of storage elements;
    a non-volatile memory system that stores:
        a first counter including a respective first value field and a respective first bitmap field for each of the plurality of storage elements; and
        a second counter including a respective second value field and a respective second bitmap field for each of the plurality of storage elements; and
    a counter management subsystem that is coupled to the at least one storage subsystem and the non-volatile memory system, wherein the counter management subsystem is configured to:
        reset the respective first value field and the respective first bitmap field for each of the plurality of storage elements;
        update, in response to a storage operation being performed on any of the plurality of storage elements, a bit in the respective first bitmap field for that storage element;
        determine that one of the respective first bitmap fields for one of the plurality of storage elements has had all of its bits updated and, in response, convert the respective first value field and the respective first bitmap field for each of the plurality of storage elements to a respective first value for each of the plurality of storage elements;
        reset the respective second value field and the respective second bitmap field for each of the plurality of storage elements;
        update the respective second value field for each of the plurality of storage elements store with the respective first value for each of the plurality of storage elements; and
        update, in response to the storage operation being performed on any of the plurality of storage elements, a bit in the respective second bitmap field for that storage element.

2. The system of claim 1, wherein the counter management subsystem is configured to:
    determine that one of the respective second bitmap fields for one of the plurality of storage elements has had all of its bits updated and, in response, convert the respective second value field and the respective second bitmap field for each of the plurality of storage elements to a respective second value for each of the plurality of storage elements;
    reset the respective first value field and the respective first bitmap field for each of the plurality of storage elements;
    update the respective first value field for each of the plurality of storage elements with the respective second value for each of the plurality of storage elements; and
    update, in response to the storage operation being performed on any of the plurality of storage elements, a bit in the respective first bitmap field for that storage element.

3. The system of claim 1, wherein the non-volatile memory system includes:
    a first non-volatile memory subsystem that stores the first counter; and
    a second non-volatile memory subsystem that is separate from the first non-volatile storage subsystem and that stores the second counter.

4. The system of claim 1, wherein the at least one storage subsystem is a NAND storage subsystem, and wherein the storage operation identifies a Program/Erase (P/E) cycle.

5. The system of claim 1, wherein the at least one storage subsystem is a NAND storage subsystem, and wherein each of the plurality of storage elements is a respective superblock provided by the NAND storage subsystem.

6. The system of claim 1, wherein each of the first bitmap fields in the first counter is configured to store 16 bits, and wherein each of the second bitmap fields in the second counter is configured to store 16 bits.

7. An Information Handling System (IHS), comprising:
    a processing system; and
    a memory system that is coupled to the processing system and that includes instructions that, when executed by the processing system, cause the processing system to provide a counter management engine that is configured to:

reset, in a first counter stored in a non-volatile memory system, a respective first value field and a respective first bitmap field for each of a plurality of storage elements in at least one storage subsystem;

update, in response to a storage operation being performed on any of the plurality of storage elements, a bit in the respective first bitmap field for that storage element;

determine that one of the respective first bitmap fields for one of the plurality of storage elements has had all of its bits updated and, in response, convert the respective first value field and the respective first bitmap field for each of the plurality of storage elements to a respective first value for each of the plurality of storage elements;

reset, in a second counter stored in the non-volatile memory system, a respective second value field and a respective second bitmap field for each of the plurality of storage elements in the at least one storage subsystem;

update the respective second value field for each of the plurality of storage elements with the respective first value for each of the plurality of storage elements; and update, in response to the storage operation being performed on any of the plurality of storage elements, a bit in the respective second bitmap field for that storage element.

8. The IHS of claim 7, wherein the counter management engine is configured to:

determine that one of the respective second bitmap fields for one of the plurality of storage elements has had all of its bits updated and, in response, convert the respective second value field and the respective second bitmap field for each of the plurality of storage elements to a respective second value for each of the plurality of storage elements;

reset, in the first counter stored in the non-volatile memory system, the respective first value field and the respective first bitmap field for each of the plurality of storage elements in the at least one storage subsystem;

update the respective first value field for each of the plurality of storage elements with the respective second value for each of the plurality of storage elements; and update, in response to the storage operation being performed on any of the plurality of storage elements, a bit in the respective first bitmap field for that storage element.

9. The IHS of claim 7, wherein the non-volatile memory system includes:

a first non-volatile memory subsystem that stores the first counter; and a second non-volatile memory subsystem that is separate from the first non-volatile storage subsystem and that stores the second counter.

10. The IHS of claim 7, wherein the at least one storage subsystem is a NAND storage subsystem.

11. The IHS of claim 7, wherein the storage operation identifies a Program/Erase (P/E) cycle.

12. The IHS of claim 7, wherein each of the plurality of storage elements is a respective superblock provided by the NAND storage subsystem.

13. The IHS of claim 7, wherein each of the first bitmap fields in the first counter is configured to store 16 bits, and wherein each of the second bitmap fields in the second counter is configured to store 16 bits.

14. A method for tracking storage device operating data via counters, comprising:

resetting, by a counter management subsystem in a first counter stored in a non-volatile memory system, a respective first value field and a respective first bitmap field for each of a plurality of storage elements in at least one storage subsystem;

updating, by the counter management subsystem in response to a storage operation being performed on any of the plurality of storage elements, a bit in the respective first bitmap field for that storage element;

determining, by the counter management subsystem, that one of the respective first bitmap fields for one of the plurality of storage elements has had all of its bits updated and, in response, converting the respective first value field and the respective first bitmap field for each of the plurality of storage elements to a respective first value for each of the plurality of storage elements;

resetting, by the counter management subsystem in a second counter stored in the non-volatile memory system, a respective second value field and a respective second bitmap field for each of the plurality of storage elements in the at least one storage subsystem;

updating, by the counter management subsystem, the respective second value field for each of the plurality of storage elements with the respective first value for each of the plurality of storage elements; and updating, by the counter management subsystem in response to the storage operation being performed on any of the plurality of storage elements, a bit in the respective second bitmap field for that storage element.

15. The method of claim 14, further comprising:

determining, by the counter management subsystem, that one of the respective second bitmap fields for one of the plurality of storage elements has had all of its bits updated and, in response, converting the respective second value field and the respective second bitmap field for each of the plurality of storage elements to a respective second value for each of the plurality of storage elements;

resetting, by the counter management subsystem in the first counter stored in the non-volatile memory system, the respective first value field and the respective first bitmap field for each of the plurality of storage elements in the at least one storage subsystem;

updating, by the counter management subsystem, the respective first value field for each of the plurality of storage elements with the respective second value for each of the plurality of storage elements; and updating, by the counter management subsystem in response to the storage operation being performed on any of the plurality of storage elements, a bit in the respective first bitmap field for that storage element.

16. The method of claim 14, wherein the non-volatile memory system includes:

a first non-volatile memory subsystem that stores the first counter; and a second non-volatile memory subsystem that is separate from the first non-volatile storage subsystem and that stores the second counter.

17. The method of claim 14, wherein the at least one storage subsystem is a NAND storage subsystem.

18. The method of claim 14, wherein the storage operation identifies a Program/Erase (P/E) cycle.

19. The method of claim 14, wherein each of the plurality of storage elements is a respective superblock provided by the NAND storage subsystem.

20. The method of claim 14, wherein each of the first bitmap fields in the first counter is configured to store 16 bits, and wherein each of the second bitmap fields in the second counter is configured to store 16 bits.

* * * * *